(12) United States Patent
Poullos et al.

(10) Patent No.: US 11,465,353 B2
(45) Date of Patent: Oct. 11, 2022

(54) HIGH MOBILITY 3D LASER PRINTING SYSTEM

(71) Applicant: PhotoFusion Technologies Limited, Basildon (GB)

(72) Inventors: Mark Peter Poullos, Farmers Branch, TX (US); Johnny Thao, Venus, TX (US)

(73) Assignee: PhotoFusion Technologies Limited, Basildon (GB)

( * ) Notice: Subject to any disclaimer, the term of this patent is extended or adjusted under 35 U.S.C. 154(b) by 266 days.

(21) Appl. No.: 16/698,260

(22) Filed: Nov. 27, 2019

(65) Prior Publication Data
US 2020/0171747 A1    Jun. 4, 2020

Related U.S. Application Data

(60) Provisional application No. 62/773,930, filed on Nov. 30, 2018.

(51) Int. Cl.
| | |
|---|---|
| B29C 64/393 | (2017.01) |
| B29C 64/268 | (2017.01) |
| B29C 64/236 | (2017.01) |
| B29C 64/153 | (2017.01) |
| B29C 64/286 | (2017.01) |
| B29C 64/245 | (2017.01) |
| B29C 64/232 | (2017.01) |
| B29C 64/277 | (2017.01) |
| B29C 64/386 | (2017.01) |
| B22F 1/16 | (2022.01) |
| C23C 24/00 | (2006.01) |
| B33Y 30/00 | (2015.01) |

(Continued)

(52) U.S. Cl.
CPC .............. *B29C 64/268* (2017.08); *B22F 1/16* (2022.01); *B29C 64/153* (2017.08); *B29C 64/232* (2017.08); *B29C 64/236* (2017.08); *B29C 64/245* (2017.08); *B29C 64/277* (2017.08); *B29C 64/286* (2017.08); *B29C 64/386* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/129; B29C 64/135; B29C 64/264; B29C 64/268; B29C 64/273; B29C 64/277; B29C 64/282; B29C 64/286; B29C 64/393; B33Y 50/00; B33Y 50/02
See application file for complete search history.

(56) References Cited

U.S. PATENT DOCUMENTS

| | | | |
|---|---|---|---|
| 5,200,230 A * | 4/1993 | Poullos | ................ C09D 5/1668 427/388.1 |
| 5,811,754 A | 9/1998 | Nakatani et al. | |

(Continued)

*Primary Examiner* — Atul P. Khare
(74) *Attorney, Agent, or Firm* — Welsh Flaxman & Gitler LLC

(57) ABSTRACT

A system for producing images directly on a surface includes an operational curing system comprised of a thermal acquisition system, a distance monitoring device, and a directed radiant energy source. The system also includes a support assembly for supporting the operational curing system relative to a substrate and a computer-based control system processing data and controlling the operational curing system and the support assembly.

15 Claims, 24 Drawing Sheets

(51) Int. Cl.
*B33Y 50/02* (2015.01)
*B33Y 10/00* (2015.01)

(56) References Cited

U.S. PATENT DOCUMENTS

| | | | | |
|---|---|---|---|---|
| 7,661,387 | B2 * | 2/2010 | Poullos | B05D 3/0209 |
| | | | | 118/308 |
| 7,897,214 | B2 * | 3/2011 | Poullos | B63B 59/00 |
| | | | | 427/470 |
| 10,239,090 | B2 * | 3/2019 | Poullos | B05D 3/06 |
| 10,695,865 | B2 * | 6/2020 | Graham | B23K 26/342 |
| 10,994,477 | B1 * | 5/2021 | Matusik | B33Y 50/02 |
| 11,084,132 | B2 * | 8/2021 | Bogdan, Jr | H01S 5/4081 |
| 2009/0128615 | A1 | 5/2009 | Miller | |
| 2011/0261339 | A1 | 10/2011 | Van Boxmeer et al. | |
| 2015/0165556 | A1 * | 6/2015 | Jones | B33Y 30/00 |
| | | | | 219/76.14 |
| 2015/0298166 | A1 | 10/2015 | Poullos | |
| 2016/0214322 | A1 | 7/2016 | Dudley | |
| 2017/0271843 | A1 | 9/2017 | Batchelder et al. | |
| 2018/0126663 | A1 * | 5/2018 | Jun | B29C 64/194 |
| 2018/0222125 | A1 | 8/2018 | Wynne et al. | |
| 2019/0009472 | A1 | 1/2019 | Mark | |
| 2019/0329321 | A1 | 10/2019 | Holt | |
| 2021/0362431 | A1 * | 11/2021 | Bruning | B33Y 30/00 |

* cited by examiner

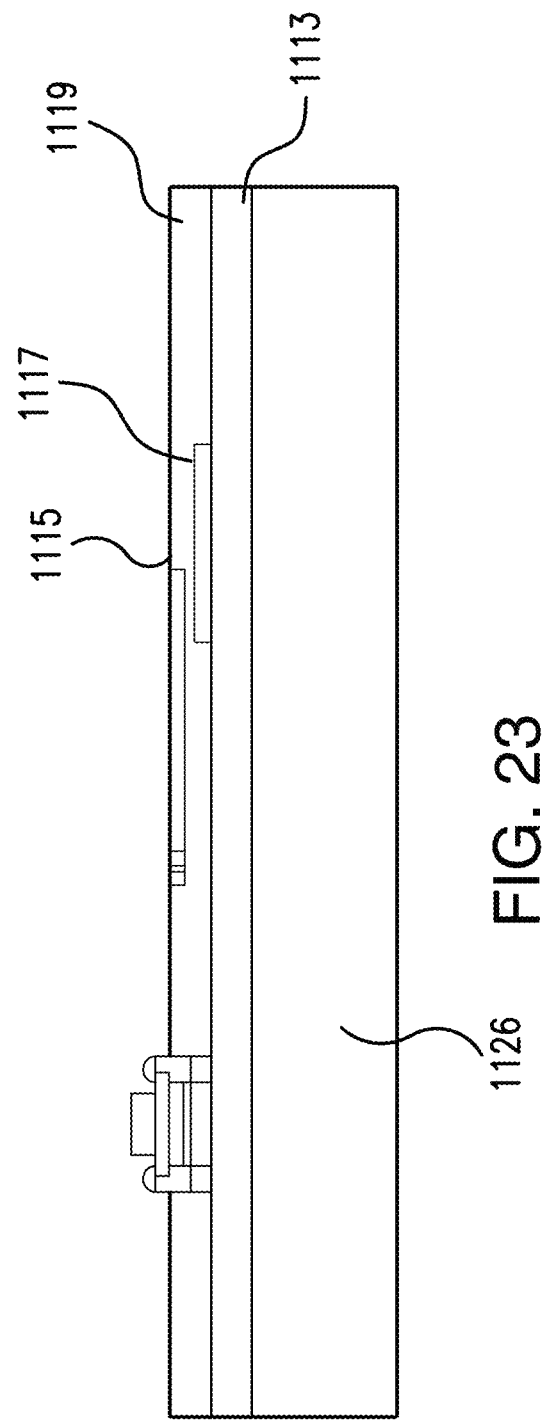

HIGH MOBILITY 3D LASER PRINTING SYSTEM

CROSS REFERENCE TO RELATED APPLICATION

This application claims the benefit of U.S. Patent Application Ser. No. 62/773,930, entitled "HIGH MOBILITY 3D LASER PRINTING SYSTEM," filed Nov. 30, 2018, the content of which is incorporated herein by reference in its entirety.

BACKGROUND OF THE INVENTION

1. Field of the Invention

The invention relates to printing system. In particular, the invention relates to method and systems for applying durable colorfast coatings over large and topographically sophisticated structures.

2. Description of the Related Art

Color images of multicolored photos often made with digital imaging through various devices are ubiquitous in use and scope of application in our modern society. One way in which people use these images is through the application of the images to various object. The majority of these digital images are transferred electronically through single images often in JPEG format. Over the last few years these images have become more and more predominant in our society to convey information. Today such images are used for signs, labels, logos and advertising of products. These are just a few examples.

Over the past 40 years many attempts have been made in the use of lasers to reproduce images and other forms of graphics on various types of media and material substrate 26. More than often these types of systems have been relegated to high-end laser printers and commercial graphic art printers of limited size and utility. The majority of the current systems are far from being portable and can only be used in applications where the printed or etched media to be printed on is often dimensionally flat and is fed through a conveyor apparatus and then through the laser printing system. Further to this; color imaging is even made more difficult as previous methods were mainly printed with translucent inks making the print quality highly dependent on the substrate. This has caused high resolution images to be relegated to standardize media that is relatively small and difficult to export onto multiple or varied substrates.

For example, today advertising is used in many far afield arenas and especially so in the transportation market. This is because transportation makes an excellent conveyance of marketing information. Much of this advertising imagery is done by car wraps truck wraps and skins. These types of image media are labor intensive, and the required equipment is cumbersome and expensive.

Further to this the application skill that is required is that of a complex nature. Often applicators are trained for more than a year before they're allowed to proceed on their own.

Printing systems and laser engravers used to form images on three-dimensional objects have been produced by several manufacturers. Typically, these systems require a methodology for manipulating the beam over the targeted surface. Often the beam targeting and manipulation is accomplished with reflective optics and in some cases with transmissive spatial light modulators. Various optical components are utilized to position the beam on the target surface uniformly to maintain a consistent beam footprint. The original data to be printed is typically represented in a human readable form. This information is then scaled or dimensionally altered whereby the image elements are scaled proportionally on the desired surface for which it is to be printed. Given the properties of laser etching and coatings as well as the very nature of electromagnetic energy itself; it is easily understood that the properties by which a laser graphics application and laser engraving is limited to the resolution or spot size of the beam on the target surface. It is understood that added control or controls over large and complex surface require more resolution not less, which gives rise to the need for finer control parameters. This intern requires the need for a smaller beam footprint at or near diffraction limitations of the optical system. In U.S. Pat. No. 7,897,214B2, a method is described whereupon the system devised is directed to "dividing the substrate into a plurality of sections covering the entire surface of the substrate;" It should be noted that no matter how complex the substrate structure is, the act of dividing it into increasingly smaller units allows for the possibility of higher resolution and subsequently a higher level of required control. This is true whether one intends to etch the surface or accurately place a coating onto it. The increasingly smaller sectional application resolution control has the tendency to obviate the micro application elements at the expense of control, to the macro control resolution. This is the reason for the necessity of multiple lasers as described in U.S. Pat. No. 7,661,387B2. Both of these patents are necessary for fine control of coatings, but neither of them explains fully necessary control techniques and configuration for their configuration or practical implementation. Further application of dots of selected colors to form images have been used almost universally throughout industries for decades that manufacturer equipment that produce images such as photo's or illustrations. In concert with this fact UV curable inks and coatings have been used for years that are essential to produce images such as those described in German Patent No. DE102011109083A1. This patent as described is: A "Method for imaging or marking of objects involves forming object with one or multiple radiation curable color, where color is hardened by application of radiation on area of object provided with color".

Additionally, as juxtaposed to descriptions previous, the aforementioned visible laser beam which is coaxially aligned with the application laser is utilized in conjunction with the higher powered "application laser". This laser can then be scanned over the surface that is designated for the image application. An additional visible laser can then be used to represent the selected image and its defined area. This imaging laser is further used to scale and position the subdivided described in this text. This image that conforms to the end-user requirements on the target surface. A common method used to represent and position an image on a target surface is by use of a raster scan generator or otherwise a scalable projection device. The raster scanned beam is scanned across the surface typically from the left to right and top to bottom. The same visible laser system can also be vectored, whereby the laser is directed over the entirety of the target surface using coordinates where the laser begins and where it stops. During this process the laser beam can be turned on or off as directed by the laser control program.

In the past constructing and reproducing an image on a substrate is fraught with many challenges and especially when it comes to large structures. This task is often made more difficult by the rendering size as well as the three-dimensional geometry of the target surface. Typically, the current trend in industry is the use of stencils and vinyl wraps on very large objects. These stencils and wraps are applied with contact cement applied on one side of the self-adhesive contoured stencils. Additionally, vinyl wraps are often used where compound curves are often encountered on the structure that is to receive the printed image. Both of the aforementioned techniques are extremely time-consuming and expensive to employ. When utilizing these types of image rendering processes, the applicator often has to contend with major problems caused by stretching the material and unwittingly changing the position or the relative size of the image. A further problem that is often encountered when applying vinyl wraps is; Vinyl wraps not only suffer from unintended stretching but additionally air is often is trapped or entrained under the surface and has to be removed manually. Similarly another problem that occurs when utilizing stencils is the lack of well-defined clean lines and edges associated with their application. This often occurs where the stencil meets the substrate. Often coatings that are applied are of a sufficiently low enough viscosity to progress under the surface of the edge of the masked or stenciled area. Additionally, any dust, dirt and over spray become trapped under the mask. This also causes color bleeding and destruction of the masked coating edge. With the current invention these problems are eliminated as the laser can easily straighten and adjust edges to meet quality standards of the applicator. Additionally, as described are several unique configurations that allow for the full control of image applications and or etchings with fine element control down and to the level of the diffraction limitations of the optical system.

Other considerations often encountered when using currently available technologies to apply images occurs with illustrations or text is the use different ink formulations including UV curable inks. Many common inks have problems with adhesion and application compatibility problems and are very sensitive to adhesion as well as other compatibility issues over many types of substrates. Many substrates are simply not conducive to the use of inks. This is often because the surface is somewhat hydrophobic to the ink being applied. The inks tend to bead and or roll off the surface due to gravity and distort the image. This directly affects the line edges, and the color rendering. The same problem occurs when using paints but not necessarily to the same degree. Paints often have fixative agents in them that help them retain the original position when they are applied to a correctly selected primer base. A further problem associated with using both inks and paints is that in order to decrease bleed over and to obtain the correct color rendition these coatings would have to be applied through a jetting process. This is much the same way inkjets are used on color printers. This is a very difficult technique when used in conjunction with thick pigments that are normally found in paints. Additionally, the majority of these types of "jetted" coatings often do not have the properties required for an outdoor environment. Anybody who has used these types inks and coatings before are familiar with the fact that they fade rather rapidly in intense UV light. Further to this these types of pigments degrade rapidly in harsh environments due to the fact that these coatings are often very thin when applied. These environments often include corrosive elements such as acid rain, Ozone, and very fine particle precipitants.

The present invention attempts to eliminate many of these problems and allow a person of average skill to apply high quality graphics and images through etching or DLI (direct laser illustrating).

SUMMARY OF THE INVENTION

A primary objective of this invention is to provide a means for applying digital or graphic images in durable colorfast coatings over large and topographically sophisticated structures.

The present invention allows a person of average skill to apply high quality graphics and images through etching or DLI (direct laser illustrating). The immediate invention in question uses direct laser illustrating that forms an image through a plurality of pigmented PELs (Picture Elements) combined together and dithered to produce a completed image. This is very similar to the way poster images have been constructed for decades. Direct laser illustration is not only limited to dithering to form the color images, additional techniques can be easily employed. Any user defined illustration space may be constructed. Techniques such as with additive color mixing and dithering that utilize translucent pigments may also be utilized as well in conjunction with grayscale image formulation and other techniques.

With this in mind, it is an object of the present invention to provide a system for producing images directly on a surface. The system includes an operational curing system comprised of a thermal acquisition system, a distance monitoring device, and a directed radiant energy source. The system also includes a support assembly for supporting the operational curing system relative to a substrate and a computer-based control system processing data and controlling the operational curing system and the support assembly.

It is also an object of the present invention to provide a system wherein the thermal acquisition system is an infrared pyrometry camera.

It is another object of the present invention to provide a system wherein the distance monitoring device is a telemetry range finder.

It is a further object of the present invention to provide a system wherein the directed radiant energy source is a laser emitter.

It is also an object of the present invention to provide a system wherein the laser emitter includes a galvanometric control system.

It is another object of the present invention to provide a system wherein the laser emitter is a diode laser.

It is a further object of the present invention to provide a system wherein the diode laser includes piezo elements.

It is also an object of the present invention to provide a system wherein the laser emitter further includes an optical mirror and optical focusing elements that focus emitted electromagnetic radiation at a desired location.

It is another object of the present invention to provide a system wherein the directed energy source includes an electromagnetic radiation source and an LCD screen, and the LCD screen positioned between the electromagnetic radiation source and a target.

It is a further object of the present invention to provide a system wherein the directed energy source includes an electromagnetic radiation source and a digital mirror device, and the digital mirror device is positioned between the electromagnetic radiation source and a target.

It is also an object of the present invention to provide a system wherein the support assembly provides for movement of the operational curing system in three dimensions.

It is another object of the present invention to provide a system wherein the support assembly includes an XY gantry.

It is a further object of the present invention to provide a system including a closed loop monitoring system for rapidly assessing temperature and determining a sufficient state of cure.

It is also an object of the present invention to provide a system including a Charge-Coupled Device analyzing returned scattering of electromagnetic radiation.

It is another object of the present invention to provide a system wherein the directed radiant energy source is a laser diode array.

It is a further object of the present invention to provide a system wherein the laser diode array may be rotated.

It is also an object of the present invention to provide a system wherein light from the laser diode array is transmitted via a fiberoptic delivery system.

It is another object of the present invention to provide a method for producing images directly on a surface. The method includes the steps of aligning an operational curing system with a substrate, applying a colored powder coating material to the substrate, selectively curing the colored powder coating material, based upon a desired image to be formed, with the operation curing system, removing uncured colored powder coating material from the substrate, and repeating the steps of applying, selectively curing and removing with colored powder coating material of other colors.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 23 is a side view of another embodiment in accordance with the present invention.

DESCRIPTION OF THE PREFERRED EMBODIMENTS

Figure 1:
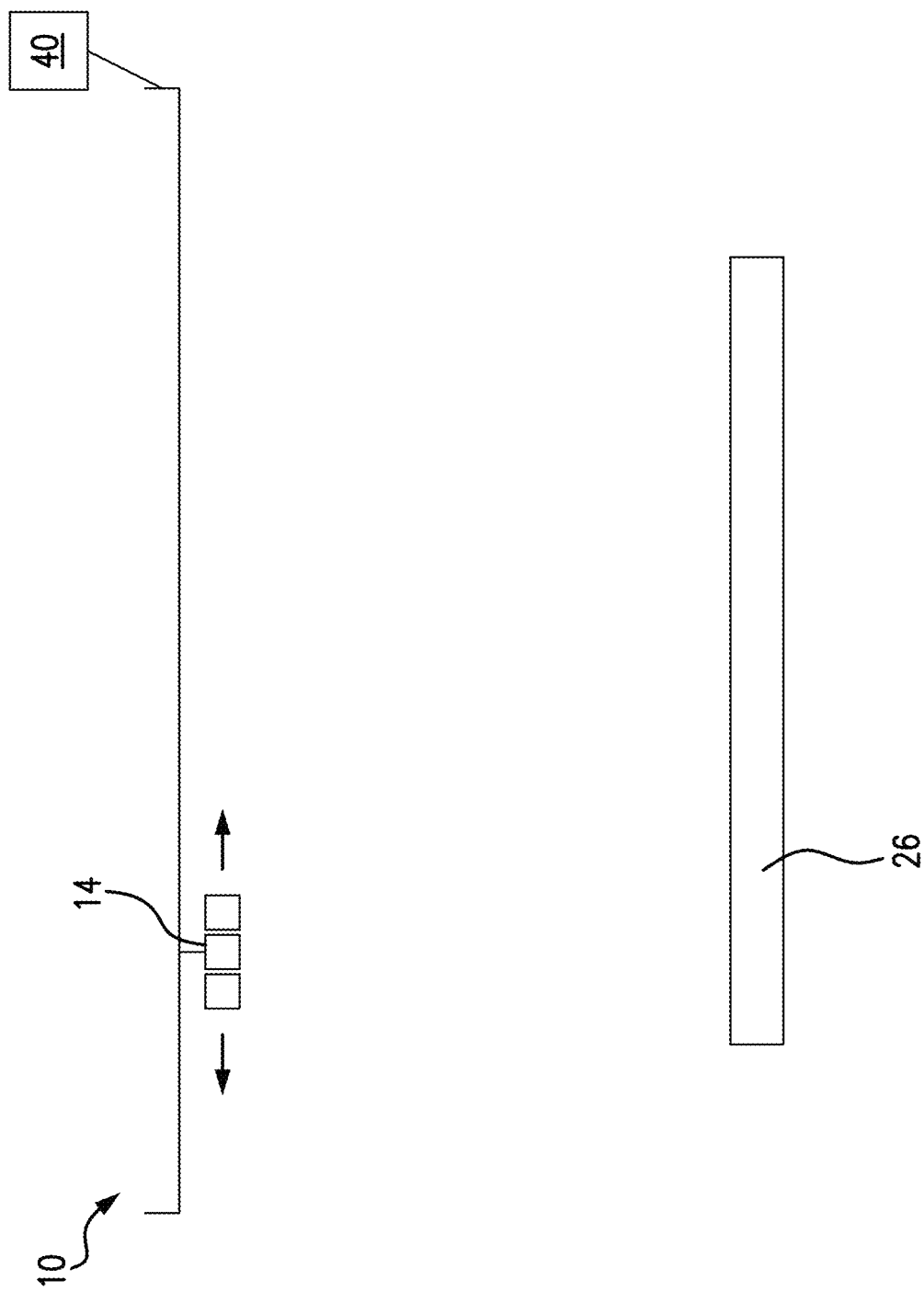
FIGS. 1 to 5 are schematics showing the process for printing a design upon a substrate in accordance with the present invention.
Figure 2:
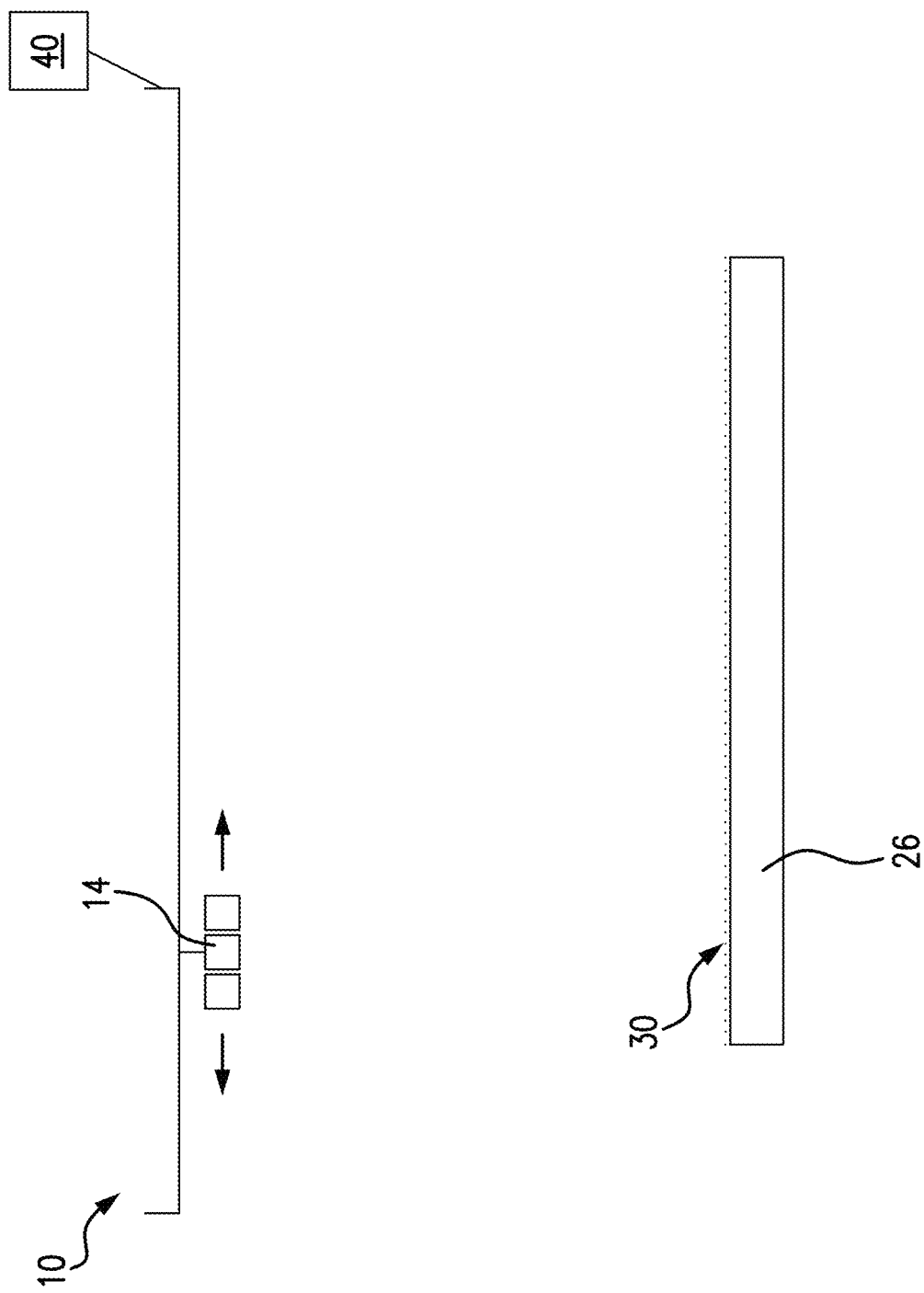
Figure 3:
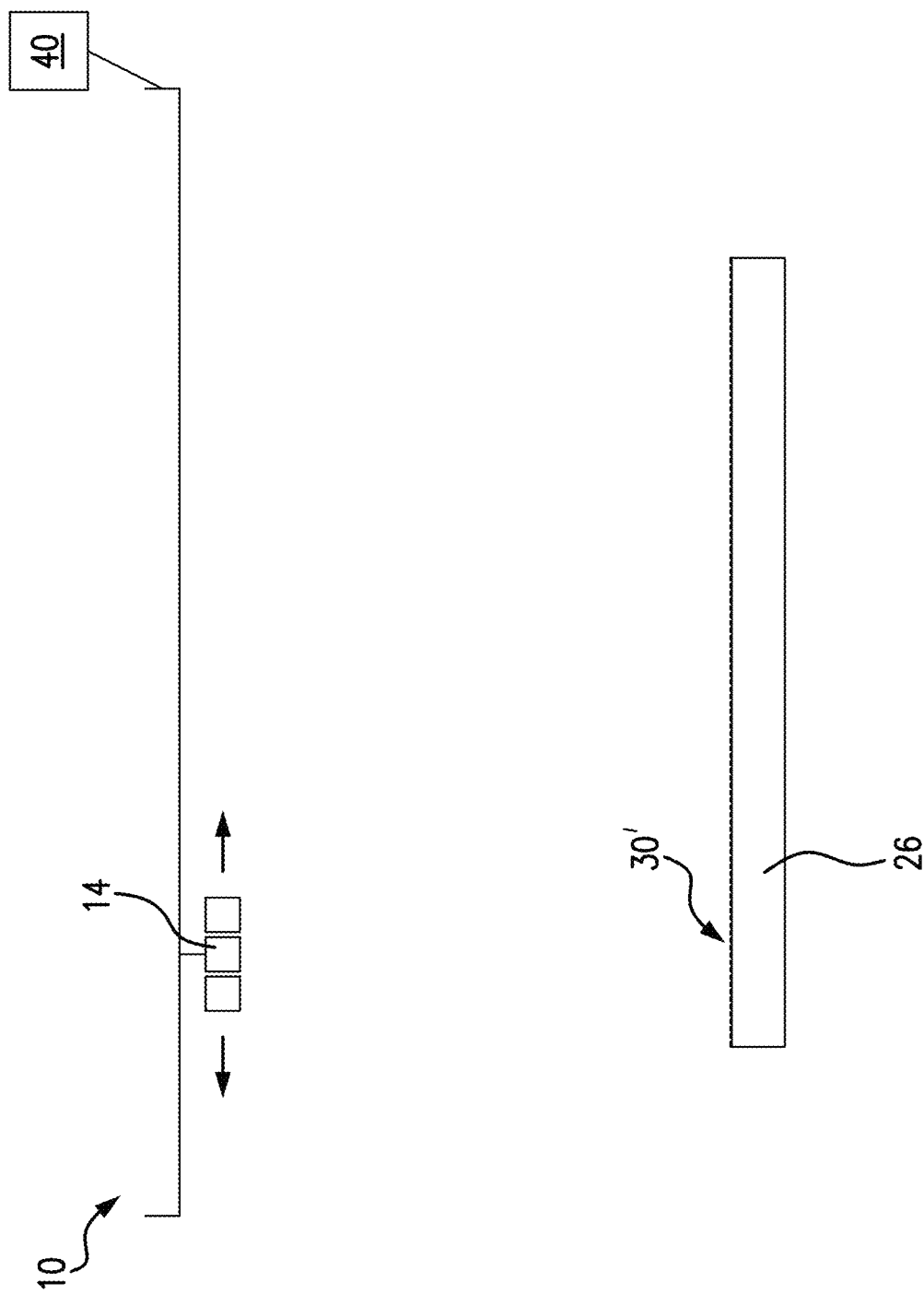
Figure 4:
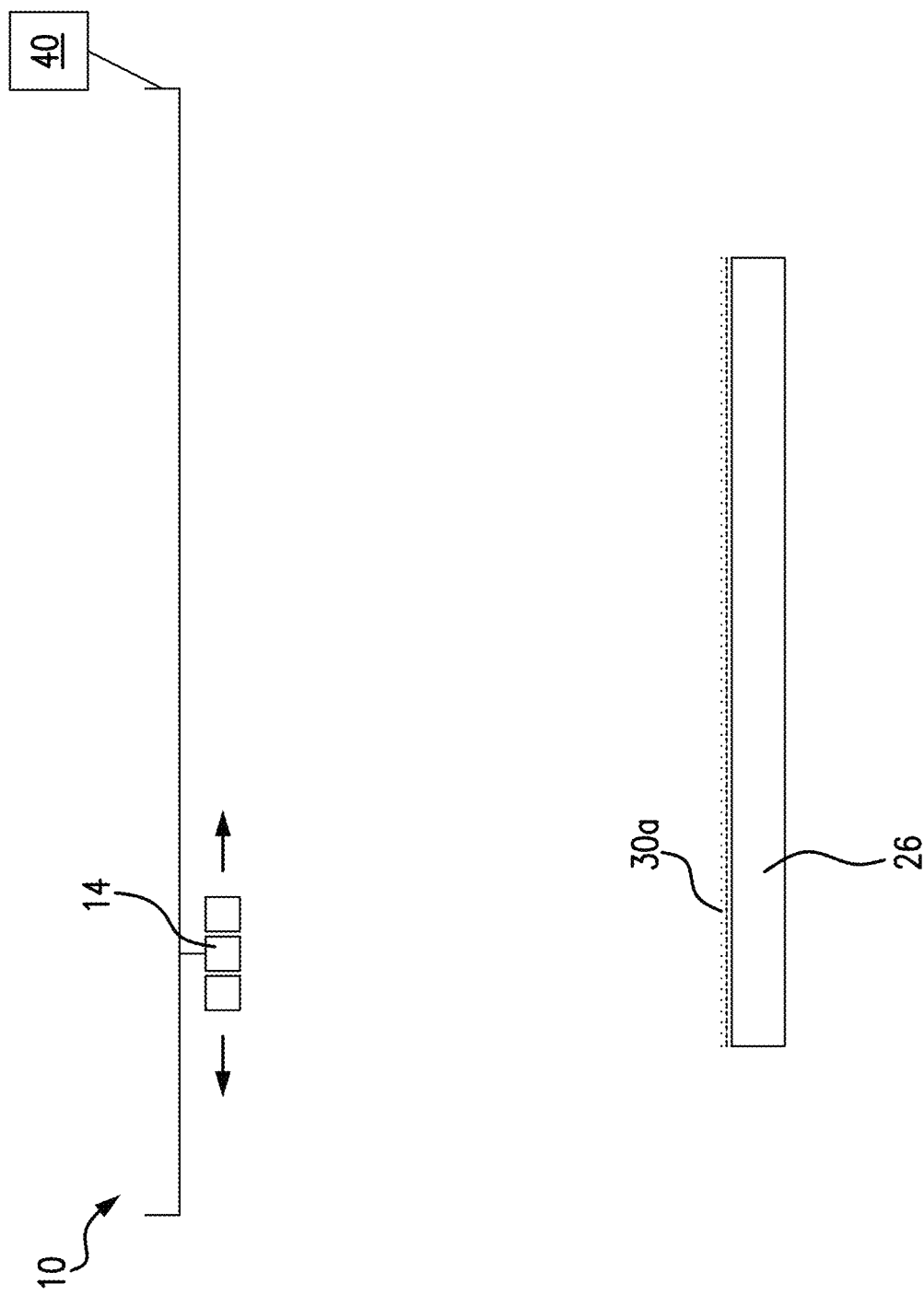
Figure 5:
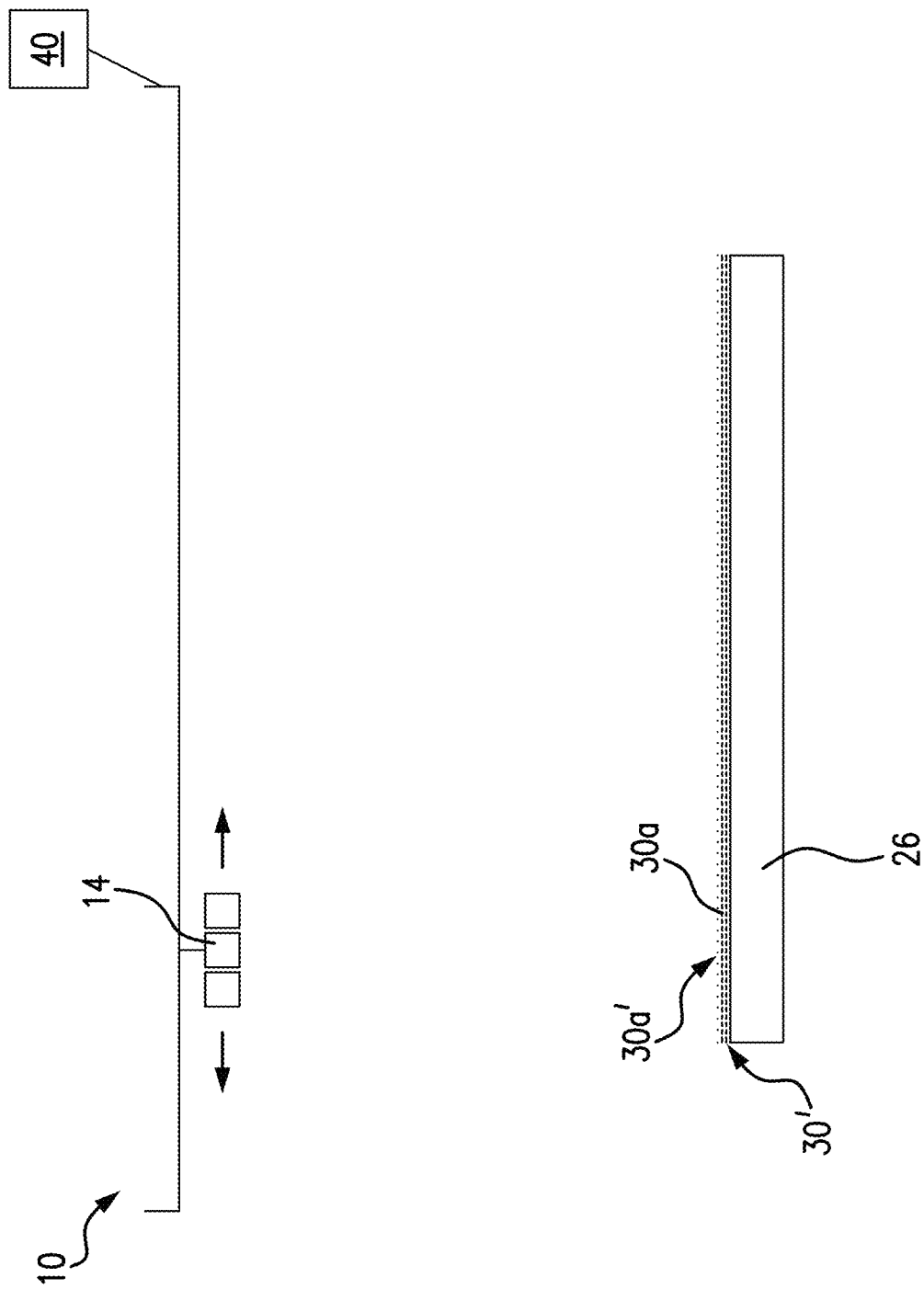

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

The present invention relates to systems and methods for producing images directly on a surface. More particularly, the systems and methods of the present invention are intended for producing color replicas from multicolored original images. These images are produced by and rendered from illustrations or pictures by coating upon a substrate individual coating elements applied (in particular, cured) electronically in a line by line manner via image processing methods.

Through application of the present invention, original images are deconstructed electronically through image processing methods and then reproduced on a large variety of printable mediums or other surfaces. These mediums or surfaces include (but are not limited to) metal surfaces, plastics, and even stone or prepared glass surfaces. In disclosing the present invention, the printable mediums and other surfaces to which the original images are reproduced are referred to herein as the substrate or target. The use of these terms should be construed in their broadest sense as the present invention has been developed with the intention of use in conjunction with a wide range of materials.

The present invention allows for the application of various images on substrates of large and irregular shapes and objects. It is contemplated the concepts underlying the present invention are also readily adaptable for incorporation in current tabletop laser etching systems to coat a wide variety of three-dimensional objects. Objects with which the present invention may be used include but are not limited to signs, placards, automobiles, motorcycles, trucks and trailers, vans, ships buses and airplanes. Therefore, with the present invention, new and innovative coatings can be applied directly to road signs without the need to remove or replace them. Other possible applications can be reproduced on interior walls in homes as well as billboards and other large advertising mediums.

In accordance with the present invention the coating materials to be used on the substrate can come in many forms. These coating materials are often referred to as inks, paints, dispersions, coatings, and powder coatings. The present invention is particularly well suited for use in conjunction with settable inks and coatings (referred to herein as curable coating materials), which are those inks and coatings which undergo a reaction, or a material polymerization change during a curing process initiated by the application of electromagnetic radiation. This is often accomplished through the form of "radcure", or (radiation curing). As mentioned above, the curing and/or hardening of curable coating materials into the cured state is commonly stimulated or initiated by the application of electromagnetic radiation, preferably from a laser or a system of lasers. In accordance with the embodiments disclosed below, a laser (or other optical source) provides a form of intense radiative light that is directed and/or scanned over the target surface upon which the image is to be formed. It is expressly understood that the laser radiation can be from various types of lasers, lamps or LED's while providing a wide range of frequencies and/or energy wavelengths. The wavelengths range from the far infrared through the visible range and extend into the UV.

As will be appreciated based upon the following disclosure, the application of electromagnetic radiation in accordance with the present invention is not directed only to mere mechanical fusing or melting of the coating material applied upon the surface of the substrate. In accordance with the present invention an apparatus is provided for direct laser illustrating on large and irregularly shaped surfaces. Additionally, there is a described mechanisms providing for the manipulation of the laser beam and the ancillary systems accompanying it.

The means by which the individual color coatings are initially applied to the substrate can be through conventional spray equipment, ink jetting, electrostatic sprayers and the like. The individual inks or coatings are cured or set in response to various types and forms of electromagnetic radiation. Often the best cure of the coating may be obtained by using one or more laser wavelengths. This is especially true in the response of certain pigments to various wavelengths.

In explaining the present invention, the use of colored powder coating materials or dispersions of colored powder coating materials, as well as their application technique, is disclosed in the following text as the present invention is described in detail. This, however, does not preclude the use of liquids and powder or dispersions which dry quickly or polymerize or react to optical energy. Nor does it preclude the use of liquid inks in certain cases where they are compatible.

With reference to FIGS. 1 to 5, an overview of the process for printing a design upon a substrate 26 in accordance with the present invention is disclosed. FIGS. 1 to 5 present an overview and it is appreciated the specific embodiments of the apparatuses and procedures for the process are explained below in substantial detail. First, a designated image to be applied to the surface of the target substrate 26 is selected and the image is processed for the creation of control instructions to be used in the application of the coating material (composed of colored powder coating material) as described below. Thereafter, an operational curing system 18 of a system for producing images directly on a surface in the form of a three-dimensional image generator 10 in accordance with the present invention and a substrate 26 are aligned and prepared for the formation of an image upon the substrate 26 (see FIG. 1). A colored powder coating material 30 (or dispersions of colored powder coating materials) is then applied to a substrate 26, for example, through the use of a conventional powder spraying device (see FIG. 2). Thereafter, the colored powder coating material 30 is selectively cured, based upon the desired image to be printed, in a systematic and controlled manner via the operational curing system 18 (under the control of a computer-based control system 40) of the three-dimensional image generator 10 to form cured colored powder coating material 30' upon the substrate 26. The operational curing system 18 of the three-dimensional image generator 10 cures the colored powder coating material 30 through the application of electromagnetic radiation (for example, via a directed radiant energy source 14 in the form of a laser (which forms part of the operational curing system 18)). The uncured colored powder coating material 30 is then removed from the substrate 26, leaving only the cured colored powder coating material 30' (see FIG. 3). The process is then repeated with colored powder coating material of other colors 30a, 30a' until the entire desired image is reproduced on the substrate 26 (see FIGS. 4 and 5). As explained above, the initial application of individual colored powder coating materials or dispersions of colored powder coating materials is achieved using conventional spray equipment, ink jetting, electrostatic sprayers, and the like.

Figure 6:
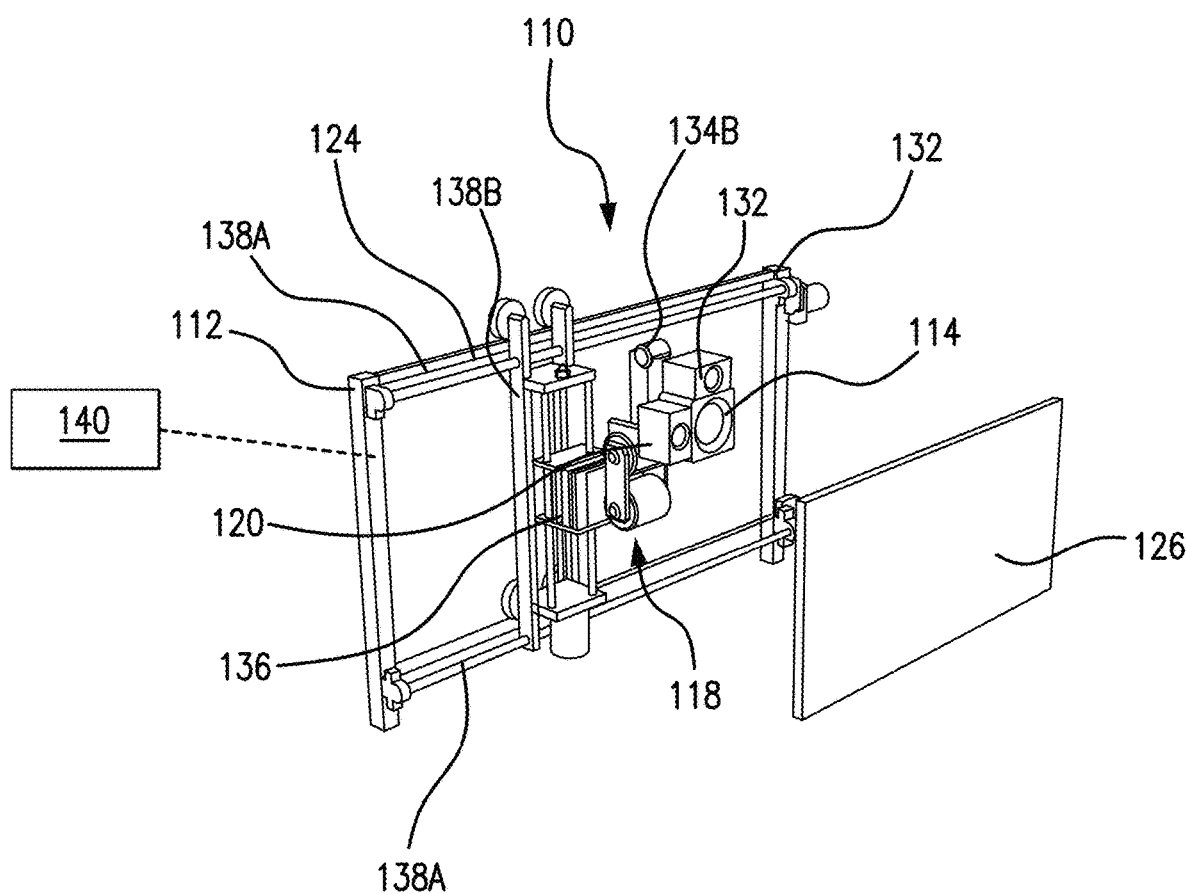
FIG. 6 is a perspective view of an embodiment of a system for producing images directly on a surface in the form of a three-dimensional image generator.

In conjunction with the application of colored powder coating materials or dispersions of colored powder coating materials upon the substrate, the present invention provides, in particular, for the controlled and effective curing thereof. As such, the present invention provides for the application of a coherent form of radiation in a specific manner in order to apply (through the process of curing) the colored powder coating materials or dispersions of colored powder coating materials that forms an image upon the substrate. Referring to FIG. 6, a system for producing images directly on a surface in the form of a three-dimensional image generator 110 is shown. The three-dimensional image generator 110 is comprised of a raster scannable system 112 with a directed radiant energy source 114. In accordance with the present invention, the directed radiant energy source is an electromagnetic radiation source in the form of a laser emitter.

In accordance with one embodiment as shown with reference to FIG. 6, the three-dimensional image generator 110 includes an operational curing system 118 comprised of a thermal acquisition system 120 in the form of an infrared pyrometry camera, a distance monitoring device 122 in the form of a telemetry range finder (for example, an infrared noncontact rangefinder, Lidar or range finder modules, and profilometers), and a directed radiant energy source 114 in the form of a laser emitter. The operational curing system 118 is mounted upon a support assembly 124 providing for movement of the operational curing system 118 in three dimensions, that is, in X, Y, and Z planes, relative to the surface of the substrate 126 upon which the three-dimensional image generator 110 is intended to cure, and thereby apply, the coating material.

As will be appreciated based upon the following disclosure, the distance monitoring device 122 is used to assess the proper focal length of optical systems and power density of the laser emitter 114 in conjunction with any given surface topography and coating qualities such as smoothness. Additionally, providing Lidar and range finder monitoring enables a means to prevent collision with stationary structures on or about the coated surface. As to the thermal acquisition system 120, it allows for monitoring of temperature, and ultimately curing of the colored powder coating materials 30 or dispersions of colored powder coating materials 30.

The support assembly 124, in accordance with one disclosed embodiment, includes an XY gantry 132 and a robotic arm 134 secured to the carriage 136 of the XY gantry 132. As those skilled in the art certainly appreciate, the XY gantry 132 include tracks or guides 138a, 138b along which a gantry carriage 136 moves by means of electric motors or other input devices along the various axes to most accurately position a working device support by the carriage 136. Movement of the gantry carriage 136 is controlled by a variety of actuators that move the gantry carriage 136 and the tracks/guides 138a, 138b in a controlled manner. In accordance with the disclosed embodiment, parallel guides 138a aligned in the X-direction support a perpendicular guide 138b aligned in the Y direction. The perpendicular guide 138b aligned in the Y direction is mounted upon the parallel guides 138a aligned in the X-direction for linear movement relative thereto. The gantry carriage 136 is mounted upon the perpendicular guide 138b aligned in the Y direction for controlled movement thereon. Through the controlled movement of the perpendicular guide 138b aligned in the Y direction and the gantry carriage 136, the operational curing assembly, which is mounted upon the gantry carriage is moved in the X and Y planes.

The support assembly 124 and the operational curing system 118 are under the control of a computer-based control system 140 which processes data and controls the various elements to produce optimal results. In this way, the three-dimensional image generator 110 provides for movement along 3 orthogonal axes, when the XY gantry 132 is used in conjunction with movement facilitated by articulated elongated elements 134a, 134b of a robotic arm 134 (upon which the operational curing system 118 is directly mounted), allowing processing of targets (that is, surfaces of substrates 126 upon which it is desired to form images) with various shapes and sizes. Using information from both the distance monitoring device 122 and the thermal acquisition systems 120, processing is performed and the operational curing system 118 is translated and maintained in desired positions relative to the complex geometry of the substrate 126.

While the support assembly 124 of the present invention combines a XY gantry 132 and a robotic arm 134, it is appreciated that the support assembly 124 may take a variety of forms, including multiple axes gantry systems, robotic systems, other known movement control systems, or combinations thereof. It is appreciated these types of XY coordinate gantry systems are well known in the art and are often employed in tabletop devices for the cutting and etching of various materials.

Figure 7:
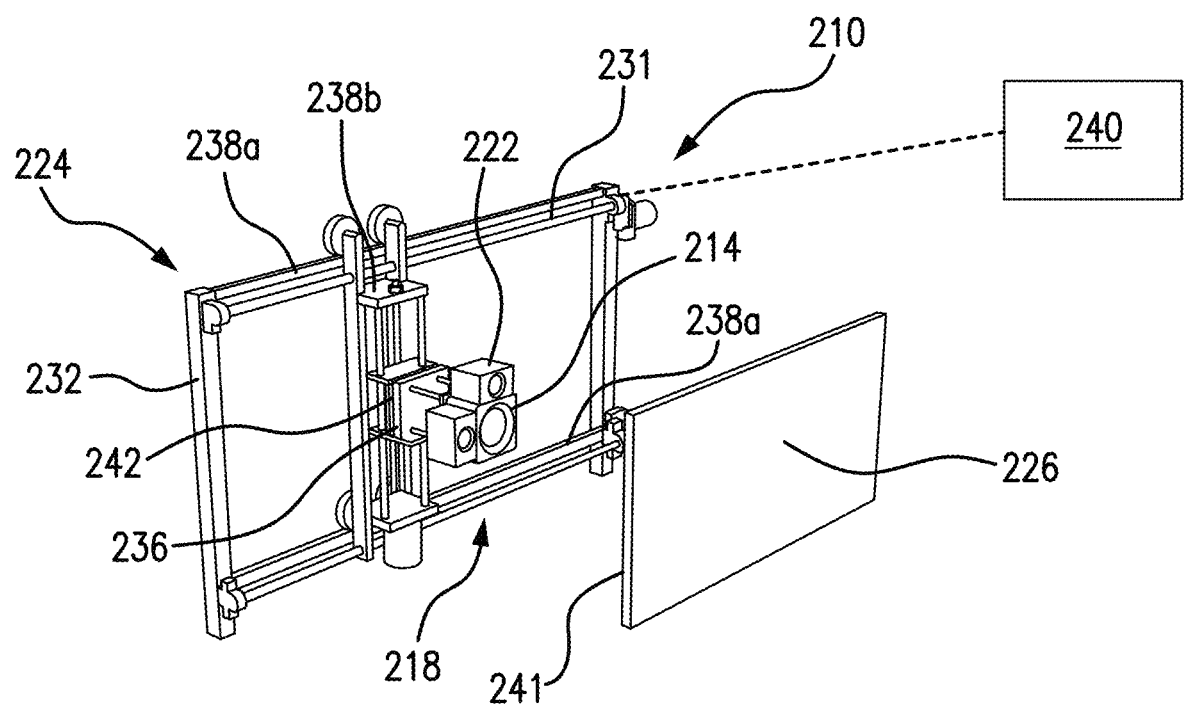
FIG. 7 is a perspective view of an embodiment of a system for producing images directly on a surface in the form of a three-dimensional image generator.

For example, and in accordance with an alternate embodiment, and with reference to FIG. 7, the support assembly 224 provides a gantry system 231 allowing for movement of the operational curing system 218 in three dimensions without the need for an articulated robotic arm. In accordance with such an embodiment, robotic arm is replaced by a telescopic extension 242 connecting the operational curing system 218 to the gantry carriage 236 and the remainder of the gantry system 231.

As with the prior embodiment, the support assembly 224 includes an XY gantry 232. The XY gantry 232 include tracks or guides 238a, 238b along which a gantry carriage 236 moves by means of electric motors or other input devices along the various axes to most accurately position a working device support by the carriage 236. Movement of the gantry carriage 236 is controlled by a variety of actuators that move the gantry carriage 236 and the tracks/guides 238a, 238b in a controlled manner. Parallel guides 238a aligned in the X-direction support a perpendicular guide 238b aligned in the Y direction. The perpendicular guide 238b aligned in the Y direction is mounted upon the parallel guides 238a aligned in the X-direction for linear movement relative thereto.

A telescopic extension 242 secures the gantry carriage 236 to the perpendicular guide 238b aligned in the Y direction for controlled movement thereon. Through the controlled movement of the perpendicular guide 238b aligned in the Y direction and the gantry carriage 236, the operational curing system 218, which is mounted upon the gantry carriage 236 is moved in the X and Y planes. Movement in the Z plane is achieved be extending or retracting the gantry carriage 236 under the control of the telescopic extension 242 that is actuated under the control of the computer-based control system 240 via actuators integrated with the telescopic extension 242.

The support assembly 224 and the operational curing system 218 are under the control of a computer-based control system 240 which processes data and controls the various elements to produce optimal results. In this way, three-dimensional image generator 210 provides for movement along 3 orthogonal axes allowing processing of targets (that is, surfaces of substrates upon which it is desired to form images) with various shapes and sizes. Using information from both the distance monitoring device 222 and the thermal acquisition systems 220, processing is performed and the operational curing system 218 is maintained in a desired position relative to the complex geometry of the substrate 226.

As briefly mentioned, a target substrate 126, 226 is depicted that lies substantially parallel to the support assembly 124, 224. The Z axis control on the support assembly 124, 224 (whether implemented via an XY gantry 132 with an articulated robotic arm 134, an XY gantry 232 with a telescopic extension 242, or other known control structure) has a limited range for which precision control can be maintained to produce consistent results. In practice, the distance monitoring device 122, 222 is linked to the Z axis control of the computer-based control system 140, 240 to provide for a precision distance measuring system that is active during the coating process such that the distance between the laser emitter 114, 214 and the target is continually monitored. As a result, the Z axis is moderated over various dimensional surface changes to maintain the desired power density and spot size.

When the operator first initiates the support assembly 124, 224, that is, gantry system control as provided by the computer-based control system 140, 240 in accordance with the disclosed embodiment, the initial task is to define the desired operating space. For example, this can be accomplished by the operator going to the furthest lower left-hand corner or preselected point of origin on the desired space for the formation of the image upon the target. This position is entered into the computer monitor of the computer-based control system 140, 240 as Point of origin (0,0,0). All other points on the target are registered from this location. This may be accomplished using many known methodologies, including stepper motor count or counts and indexed from this position or via galvanometric systems known to those skilled in the art. The operator and/or system computer, that is, the computer-based control system 40, 140 finishes the position indexing by defining at least two more corners on the surface of the substrate 126, 226 that sets the boundaries and the outer limits of the operating space.

The operator then selects the designated image to be applied to the surface of the target. The operator then scales the pixel pitch and aspect ratio via known computer algorithms operating the computer-based control system 140, 240 to fit the area to be coated. The selected images are then scaled proportionally to fit within this desired image area.

The selected images are decomposed into a selected color palette using a dithering algorithm such as the Floyd-Steinberg dithering algorithm. Because the present invention relies upon colored powder coating materials 30 (or dispersions of colored powder coating materials 30) in the application of the coating to the substrate 26, dithering is required in order to create the desired colors and associated images. While a disclosed dithering algorithm is used in accordance with the disclosed embodiment, it is appreciated color dithering of digital images can be achieved by using a limited color palette and one of several dithering techniques available. In accordance with the present disclosure, the Floyd Steinberg technique was utilized but the dithering techniques may be varied without departing from the spirit of the present invention. Color selection and number can be chosen via a computerized color detection device.

Once the image has been processed via the dithering technique, individual pixels are selected based on the limited color palette and separated into a series of isolated color maps. These color maps provide positioning of the various Picture Elements (PEL or PELs) to be applied to the substrate 126, 226. The information is then be mapped to a physical coordinate space or over a plurality of sections covering the entire surface of the substrate 126, 226. A preview that is representative of the finished product can be obtained and or altered via a computer terminal or similar monitor of the computer-based control system 140, 240.

As shown with reference to FIGS. 1 to 5, the various colored powder coating materials 30 or dispersions of colored powder coating materials 30 are then acquired and sequentially loaded into the coating material delivery system or suitable spray system as required in the creation of a desired image upon the substrate 26. After the colored powder coating materials 30 or dispersions of colored powder coating materials 30 are loaded into the coating material delivery system and spread upon or applied to the substrate 26.

The operational curing system 118, 218 starts the fusing operation of the first colored powder coating material 30 at the above described origin point. The control program of the computer-based control system 140, 240 then sequentially selects the pixel coordinate requiring curing of the application and operational curing system 118, 218 and the Picture Elements along a prescribed path are generated by the computer-based control system 140, 240. The support assembly 124, 224 then actuates a corresponding movement in the machinery to match and scale mapping of the image in a line scan of contiguous colors or dots, as defined by the first colored powder coating material 30 on the substrate 126, 226. The laser image generator 110, 210 is then translated across the entire image area using this type of control in a linear fashion to cure the first colored powder coating material 30 applied upon the substrate 126, 226 so as to create all of the required line scan elements or Picture Elements for the specific selected color or pigmentation.

After the original application of the first colored powder coating material 30 to form the desired Picture Element deposition of the selected color, the remaining excess colored powder coating material (that is, the colored powder coating material 30 that has not been cured) is removed by vacuuming or otherwise blowing or brushing it off the designated graphics area before the next colored powder coating material 30 of a different color or pigment is deposited. As such, this process is repeated layer by layer with the various colors making upon the color palette of the desired image until the image is completed. Through this sequential process of applying layer after layer of various colors or pigments of colored powder coating materials 30 a colored image results from the interplay of the many Picture Elements formed along the surface of the substrate 126, 226.

The laser power required to apply these colored powder coating materials 30 is predetermined by the control algorithm or a closed loop process monitor under the control of the computer-based control system 140, 240. It is important to note that it is not necessary at this point to fully cure or cross link each separate colored powder coating material 30. In fact, it is counterproductive as a full cure would inhibit further dithering of successive colored powder coating materials 30 or Picture Elements. The present invention simplifies the application process as many and varied coating types exist with broad ranges in energy requirements to affect a cured state.

The present invention also provides for the firm application of the colored powder coating materials 30 (that is, a line scan coated matrix) firmly to the substrate 126, 226). It is one thing to affect a type of pigmented polymer coating into a coating or colored element on a substrate and additionally alter the physical properties of coatings used; it is entirely another to have it remain in the intended place on a substrate to complete or form an image. The placement of physical elements of polymers or metal powders (from which the colored coating material is composed) in the form of physical individual elements often referred to as Picture Element's has been utilized for decades. For example, and with reference to U.S. Pat. No. 4,944,817, to Bourell et al, the application of powders of various types having disparate properties in the application to a surface is taught. Being as stated "powder comprising a plurality of materials, said plurality of materials having more than one dissociation temperature." Similarly, other patents described the use of laser sintering of polymer powder coatings. See, for example, U.S. Pat. No. 4,117,302 to Earl et al., which describes a method for fusibly bonding a coating material to a metal article. This patent describes the methods to apply powder coatings over a metallic surface. Most of the described prior art used overly simplified application techniques based upon incorrect assumptions about the curing state of the described polymers. These descriptions do not address properly the surface to be coated or the types of coatings used. This often leads to undesirable qualities such as over curing and browning causing color change and poor color management issues. An additional problem that occurs with the aforementioned simplified application techniques is it is very hard to affect a uniform and consistent bond to the underlying substrate. This is especially problematic when removing waste powders or material from the target surface as debonding often occurs when the surface is cleaned or washed off.

Figure 8A:
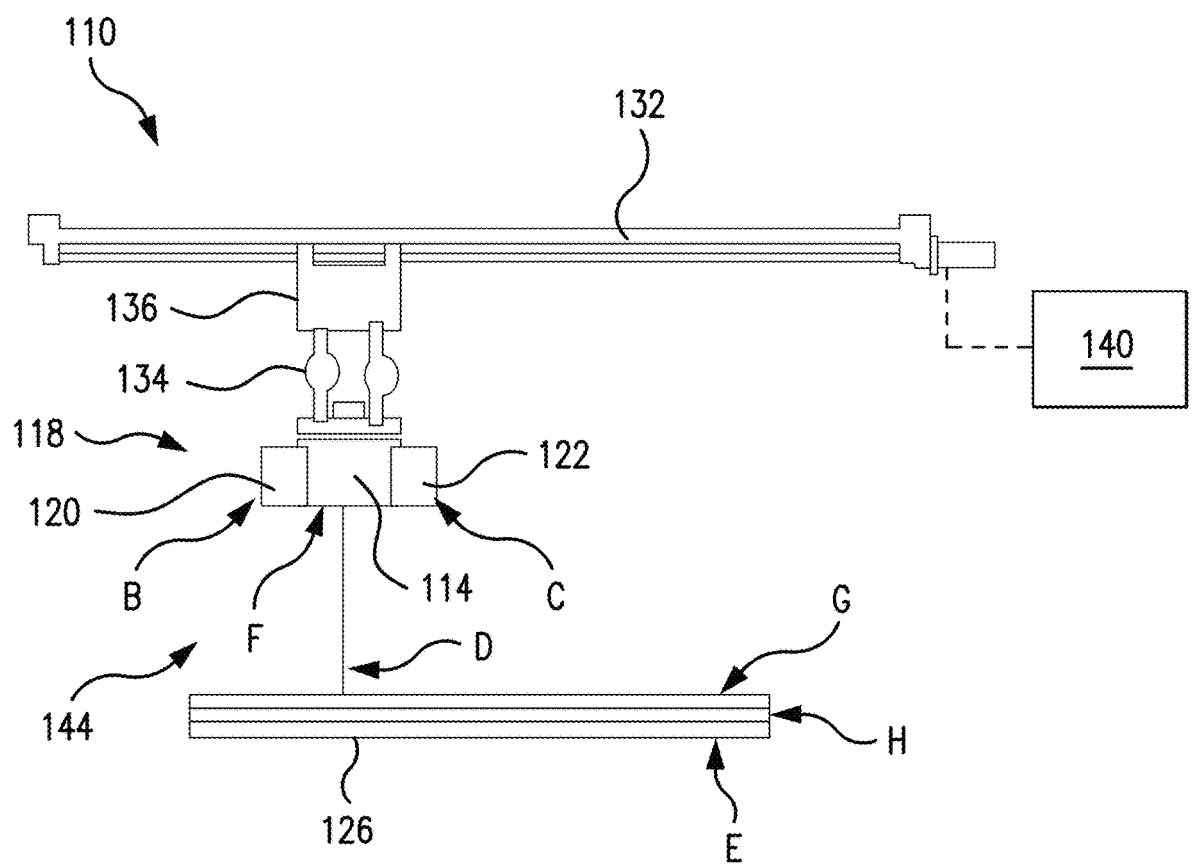
FIGS. 8A and 8B are respectively top views showing the integration of a closed loop monitoring system into the embodiments shown in FIGS. 6 and 7, respectively.
Figure 8B:
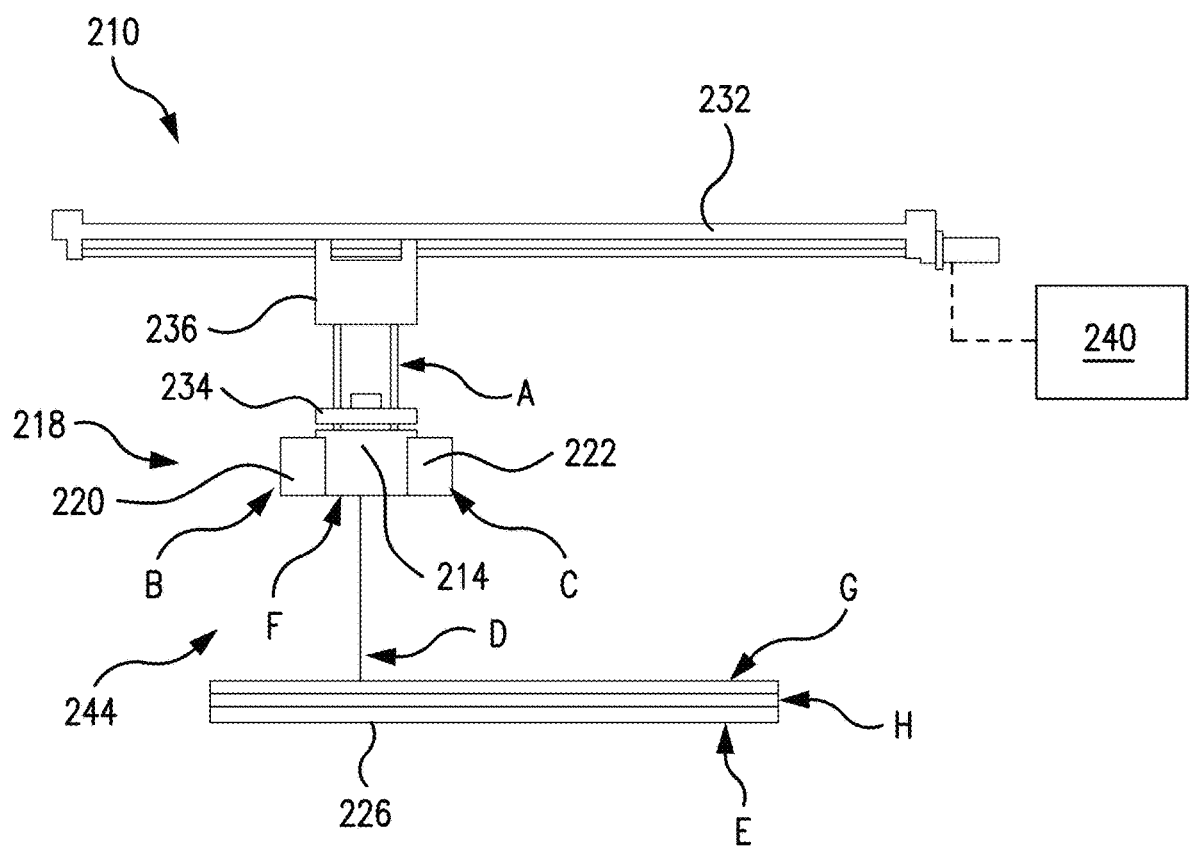

It is this reason that the present invention provides for the use of closed loop control for the application and curing of colored powder coating materials 30 to create coatings and graphics. The closed loop monitoring system 144, 244 is disclosed with reference to FIGS. 8A and 8B. The closed loop monitoring system 144, 244 of the present invention is facilitated by the thermal acquisition system 120, 220 as a mechanism to provide a means to rapidly assess temperature and determine a sufficient state of cure of the colored powder coating materials 30. The closed loop monitoring system 144, 244 uses a high speed pyrometer 120, 220 to evaluate the temperature of the acquired colored powder coating materials 30 on the substrate 126, 226 in conjunction with the computer-based control system 140, 240 to ensure that sufficient energy is being used to thermally fuse the colored powder coating materials 30 in the creation of the Picture Elements.

Figure 9:
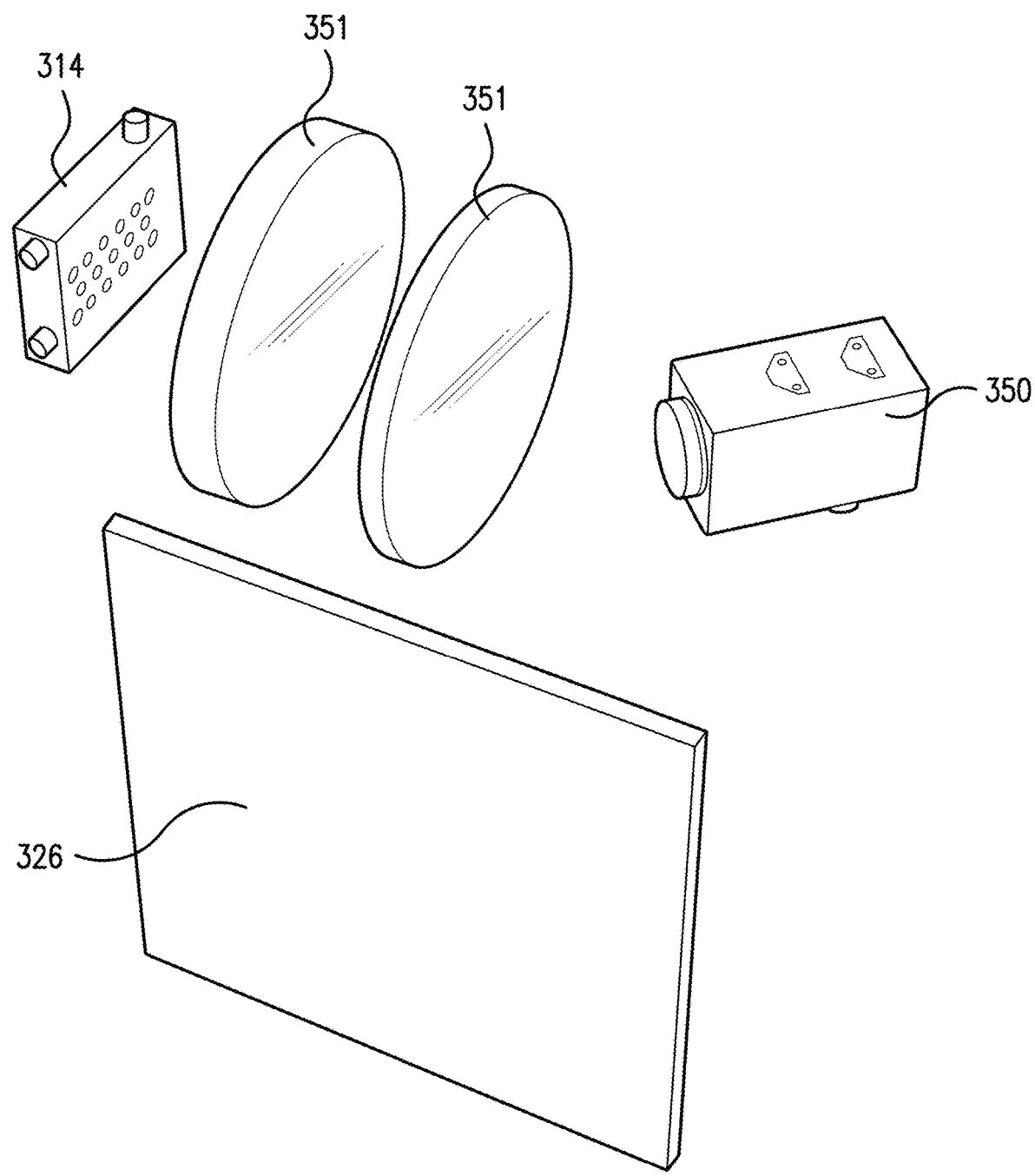
FIG. 9 is a perspective view of an embodiment of a laser emitter for use in conjunction with the present invention.

In accordance with the alternate embodiments disclosed herein it should be appreciated various elements disclosed herein can be used in a variety of combinations while remaining within the spirit of the present invention. In accordance with one alternate embodiment, and with reference to FIGS. 9 and 10, the laser emitter of the directed radiant energy source may take the form of a diode laser 314. In particular, the diode laser 314 is attached to the support assembly 324 in a manner such that the diode laser 314 is not on axis with the thermal acquisition system 320 and the distance monitoring device 322 (which are mounted to a support assembly as described above with reference to FIGS. 6-8), but rather is independently mounted upon the support assembly 324. The electromagnetic radiation from the diode laser 314 is converging on the target 326 at central point at a fixed distance via the use of an optical mirror 350 (in conjunction with optical focusing elements 351) that focus the emitted electromagnetic radiation at a desired location.

Figure 10:
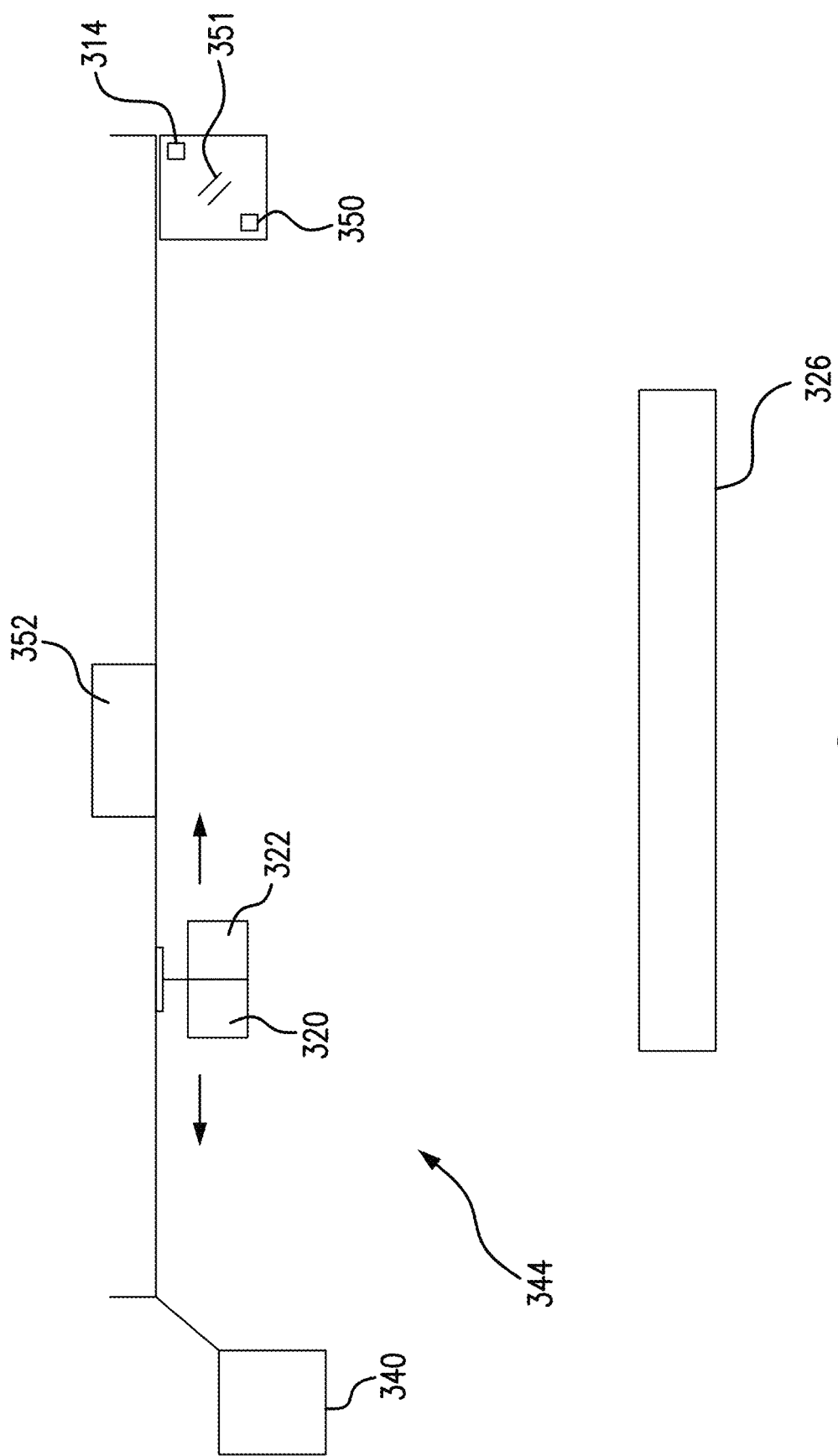
FIG. 10 is a schematic of an embodiment of a system for producing images directly on a surface using the laser emitter disclosed with reference to FIG. 9.
Figure 11:
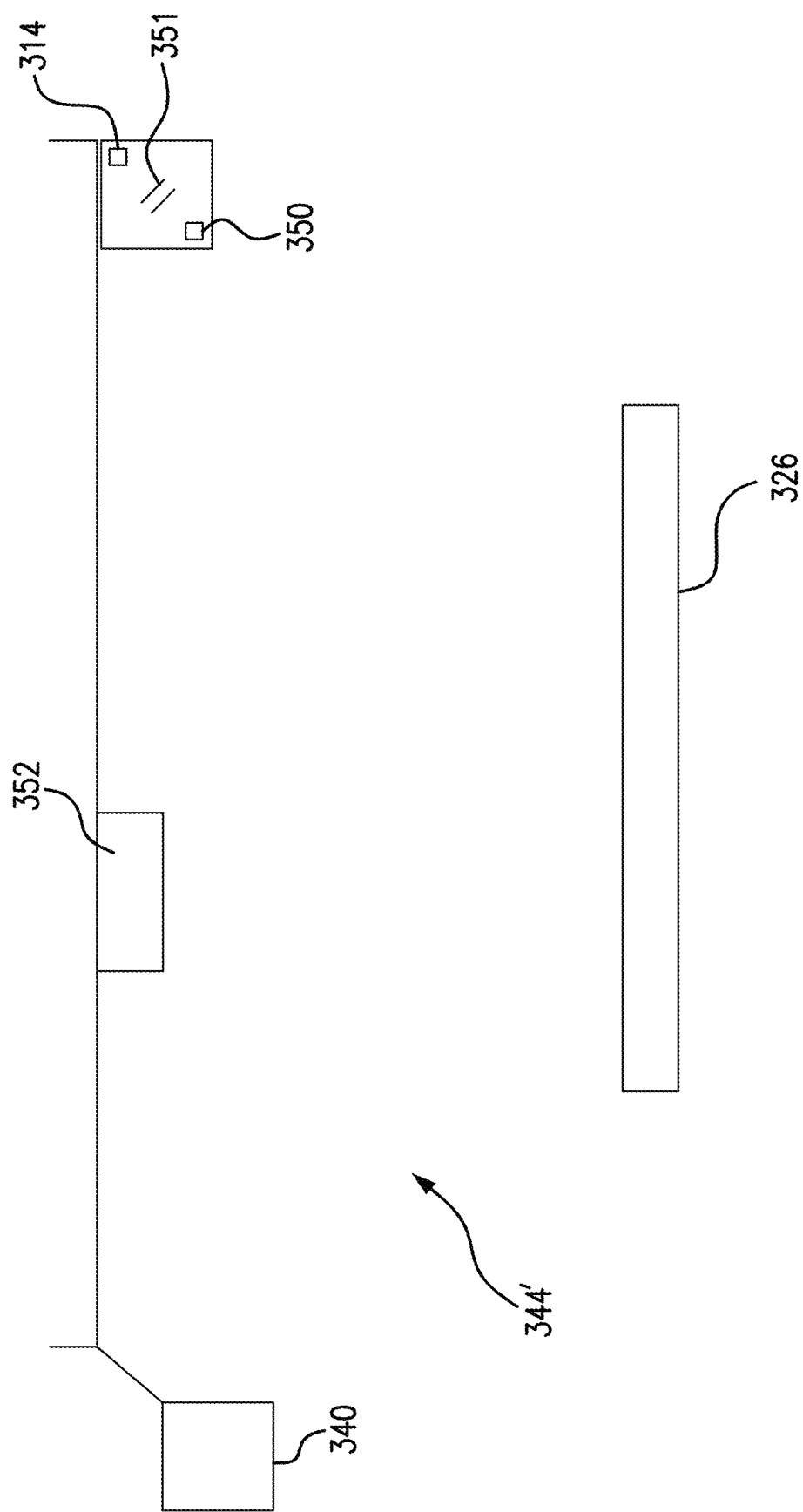
FIG. 11 is a schematic of another embodiment of a system for producing images directly on a surface using the laser emitter disclosed with reference to FIG. 9.

In addition to this, and with reference to FIGS. 10 and 11, the target 326 may be illuminated with electromagnetic waves by the aforementioned diode laser 314 in such a way that the state of cure may be monitored via a CCD (Charge-Coupled Device) 352 analyzing the amount of returned scattering of the diode laser 314 to a predetermined value given for any previously qualified coating type; given that the amount of scattering of the electromagnetic radiation decreases as the cured state of the coating element increases. The monitoring of the colored powder coating materials 30 through the use of scattered electromagnetic radiation is an alternate mechanism for use in conjunction with the closed loop feedback system described above with reference to FIG. 8 (see FIG. 10) or as a replacement for the closed loop feedback system described above with reference to FIG. 8 (see FIG. 11). As such, the systems disclosed in conjunction with the embodiments disclosed with reference to FIGS. 10 and 11, employ closed loop feedback systems 344, 344' providing for the measurement of the aforementioned scattered electromagnetic energy that is reflected off the target that is monitored by the CCD imager 352 (and a thermal acquisition system 320 when used in accordance with the embodiment of FIG. 10). The scattered light signal is converted to a digital signal that can be used via computer monitor of the computer-based control system 340 to adjust the energy emitted by the primary electromagnetic energy emitter, that is, the diode laser 314, in accordance with the disclosed embodiment. The electromagnetic energy generated by the diode laser 314 is tightly focused on the target surface which causes rapid temperature changes. By using a closed loop control system 344, the temperature can be monitored and power adjusted accordingly by the computer-based control system 340.

Figure 12:
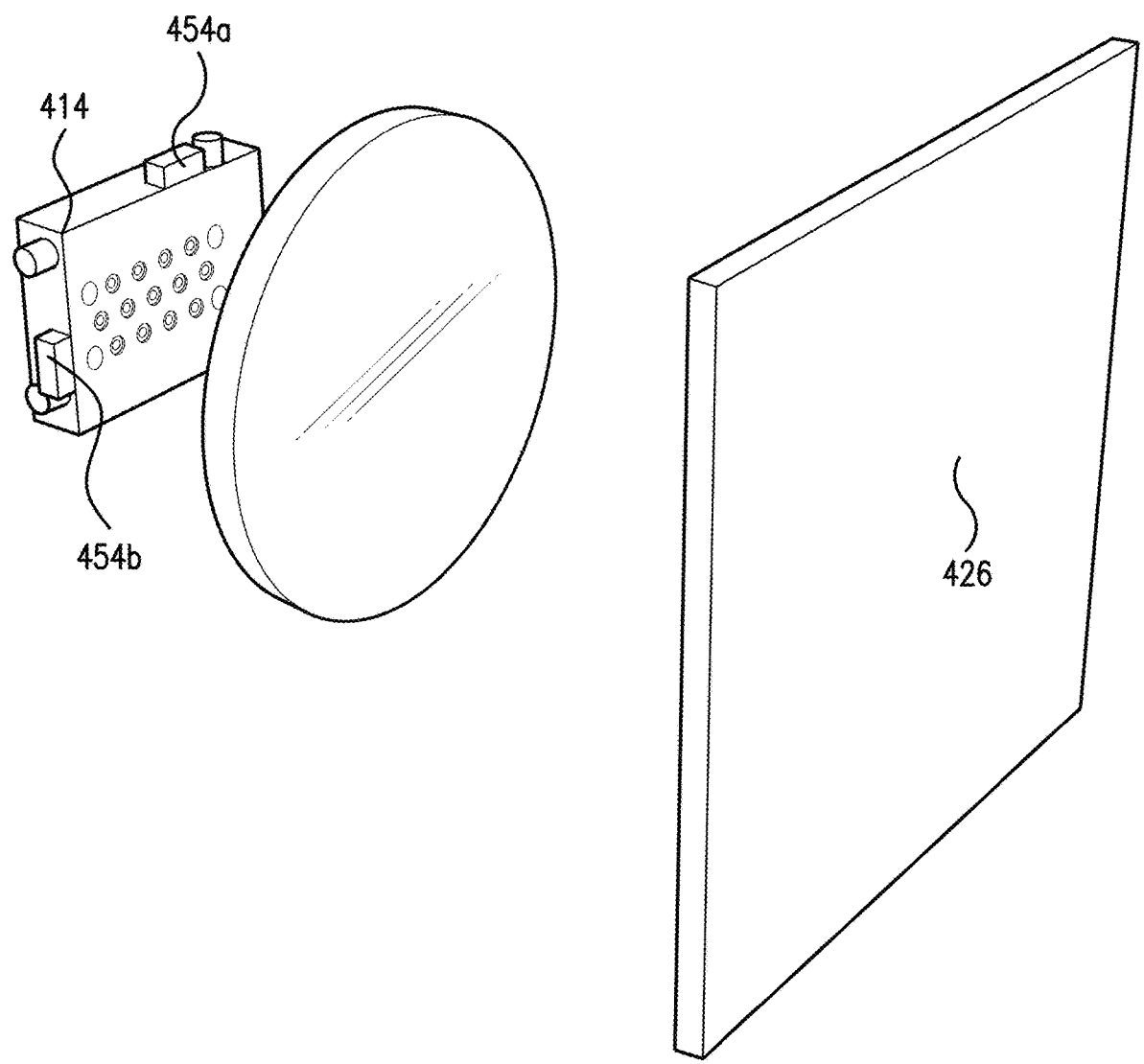
FIG. 12 is a perspective view of another embodiment of a laser emitter for use in conjunction with the present invention.

In accordance with another embodiment of the directed radiant energy source, and with reference to FIG. 12, increased processing speed, while maintaining high power levels and still maintaining full closed loop control, is achieved by dithering the target region by introducing noise through the use of piezo elements 454a, 454b. Such an embodiment may be implemented using the mounting, monitoring and movement techniques described above. These ×piezo elements 454a, 454b are depicted in FIG. 12. The piezo elements 454a are attached slightly off top center in the Y axis in order to induce a wobbling motion of the diode laser array 414 when activated. This is in concert with an additional piezo element 454b slightly off center in the X axis. When phased appropriately the amplitude can be adjusted to form a circular pattern on the target. The dimensional characteristics are adjusted by amplitude modulation where the combined X+Y axis are in the form of the function $Fx=X^2+Y^2$. The diameter of the circle as well as the velocity of its formation can be used in a controlled feedback loop to vary the power density on the target. Other salient control properties of the laser emitter application power can be described as variations of the following elements.

Laser wavelength
pulse width
CW or pulse width modulation
pulse shaping
joule rating requirements or power level for a particular coating type.
Application overlap tapering
Smoothing, blending and dithering and processing to a full cure.

For most applications energy or Joule ratings can be determined by selecting the coating requirements from a lookup table and then comparing that lookup table over the various selectable application substrates 426. In practical operation, this will be an automated process. In general, the power rating is typically between 20 millijoules and up to 1400 millijoules. This corresponds to spot sizes that range in diameter from 0.006" to 0.088".

As briefly mentioned above with reference to FIGS. 1 to 5, after the colored or pigmented colored powder coating materials 30 is applied and cured an additional cleaning operation is performed over the entire target area. This again is accomplished by simply blowing off the remaining powder of the colored powdered coating material 30 or preferably removal by vacuuming up the remaining powder of the colored powdered coating material 30 and recycling it and in some instances a combination of both. The entire process is then repeated for each colored or pigmented colored powder coating material 30 as required in accordance with the pre-generated color space.

When the final pigmented powder coating of the colored powder coating material 30 is applied and all the uncured powder of the colored powder coating material 30 is removed from the target surface, the surface coating image is processed further, for example, by over scanning the coated surface with an appropriate amount of electromagnetic radiation from the laser emitter or through the broad based application of electromagnetic radiation in another known manner. This tertiary processing sets (or cures) the thermoset polymer to its fullest extent. Additionally, non-thermoset powders are processed as to fuse and dither all the colors uniformly where desirable to a more smoothed and uniform surface. Further a clear coating layer 141 can also be applied over the entirety of the finished coated image 143 in a similar manner (for example, see FIG. 7).

It is appreciated that the concepts underlying the present invention are suitable for differing applications and different coatings and over other various substrates.

In addition to the application of line scan elements or Picture Elements, it is necessary to apply these coatings and graphics with an acceptable level of resolution to depict an image or graphic accurately. For most poster images and the like, the resolution of 150 dpi or dots per inch is desired.

With this in mind, the present invention further provides methodologies to increase application efficiency. As the coating applications for many of the large images have a significant number of dithered color elements dots or Picture Elements to be applied; it is appreciated that applying these Picture Elements in a linear fashion or one by one would require a great deal of stability and time. Therefore, the present invention provides methods and methodologies that increased stability and decrease the application time.

Figure 13:
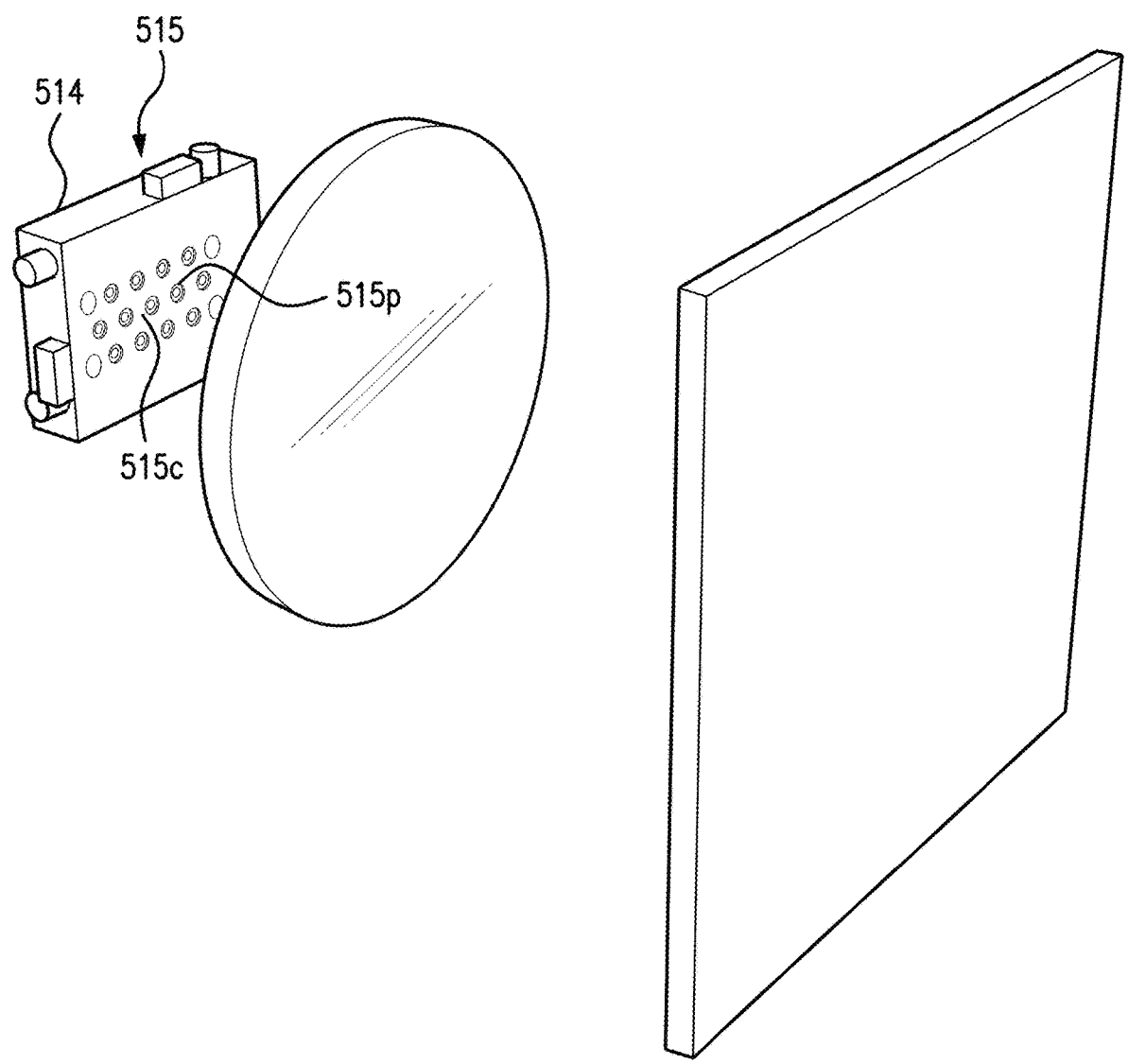
FIG. 13 is a perspective view of a further embodiment of a laser emitter for use in conjunction with the present invention.
Figure 14:
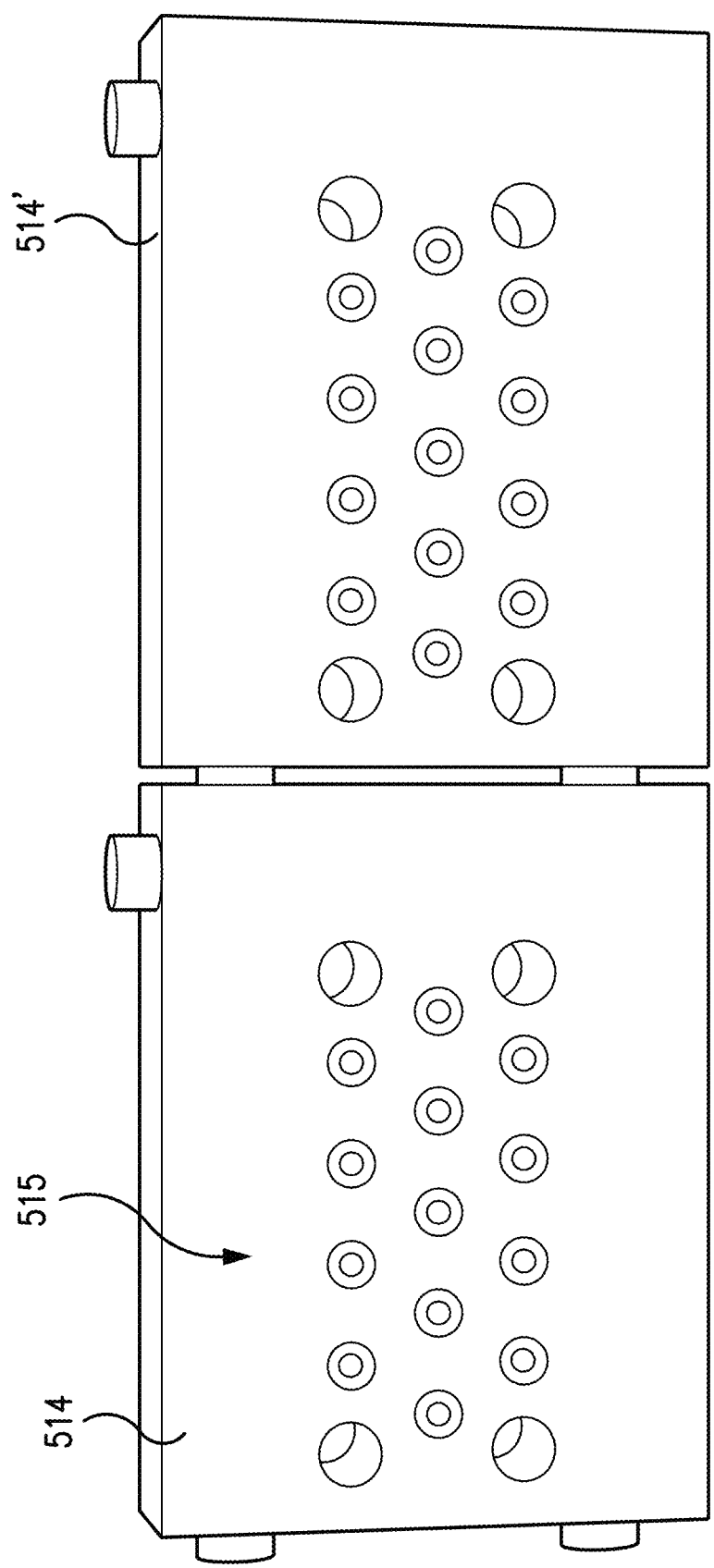
FIG. 14 is a perspective view of yet another embodiment of a laser emitter for use in conjunction with the present invention.

For example, and with reference to FIG. 13, another embodiment of a directed radiant energy source is disclosed. In accordance with this embodiment, a multi-element laser diode array (or application head) 514 with integral optics (not shown) can be used as an alternative to the laser diode disclosed with reference to FIG. 9. This laser diode array 514 is modular such that additional laser diode segments 514' can be attached to the distal ends of the original laser diode array, increasing its functionality and its processing speed (see FIG. 14). The specific laser diode element position is implemented in such a manner as to provide the best pixel pitch during the coating application. This is not to say that other configurations could not increase the pitch and Picture Element density. This is simply by way of example, a description on how to design and configure laser diode elements as utilized in accordance with the present invention. The arrangement of the laser diode elements 515 making up the multi-element laser diode array 514 is typically placed in and staggered in an alternating linear pattern. In this description the laser diodes elements 515 form a single X pattern module with one laser diode element 515*c* at the center and four more laser diodes 515*p* placed at right angles to each other in relation to the center laser diode element 515*c*.

Figure 15:
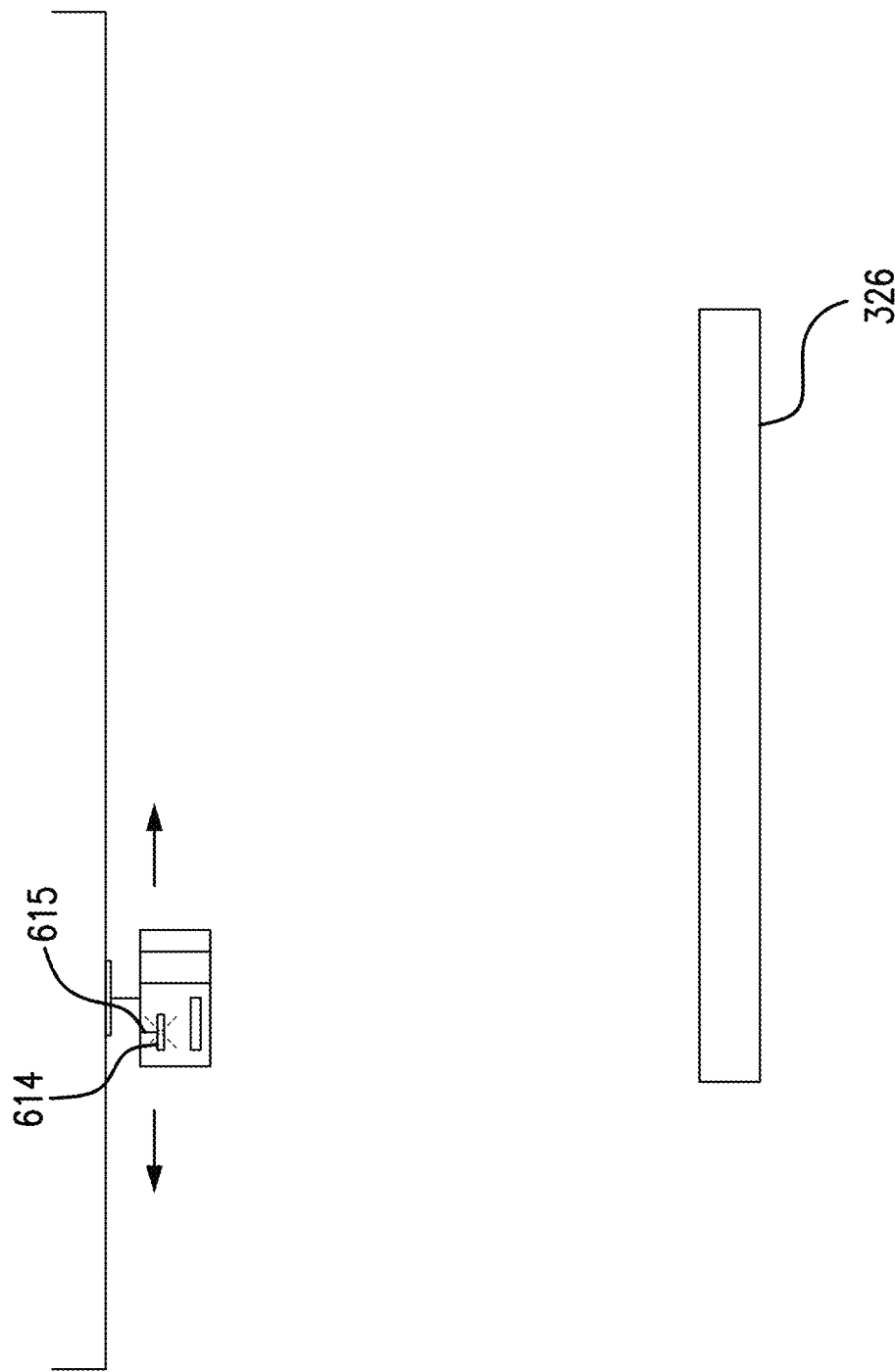
FIG. 15 is a schematic of another embodiment of a system for producing images directly on a surface.
Figure 16:
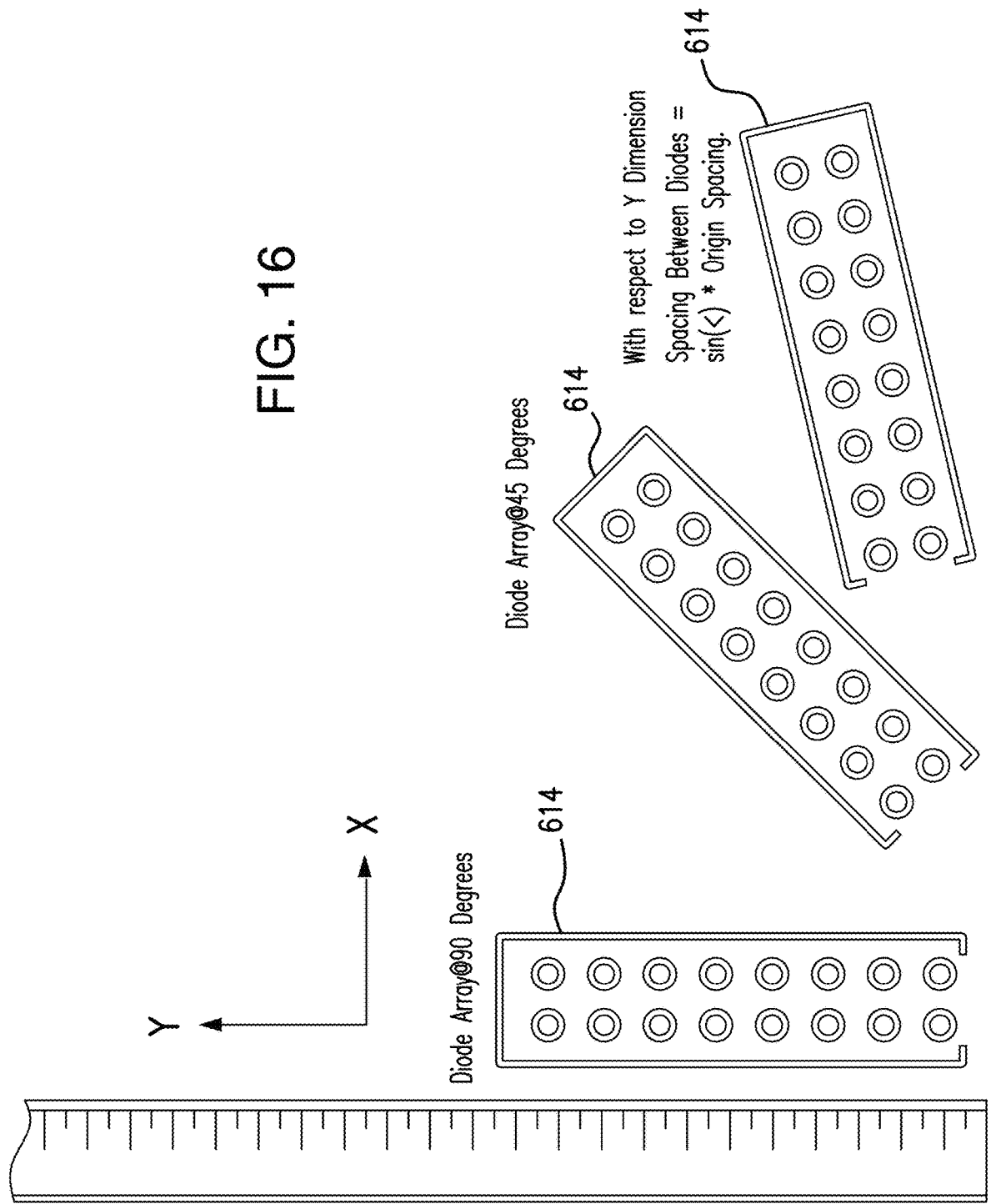
FIG. 16 is a schematic demonstrating the effect of rotating a laser diode array upon the concentration of the light ultimately produced by the array.

Referring to FIG. 15 the aforementioned laser diode array 614 (as disclosed with reference to FIGS. 13 and 14) can be centered on a supporting rotational element 615. The laser diode array 614 can then be rotated up to a maximum of 45° to the plane of application, that is, the plane of the substrate 626, and in the forward processing direction. As shown with reference to FIG. 16, this allows the individual laser beams to converge about the central axis and increase the image resolution upon the substrate 626. As demonstrated in FIG. 16, the rotation of the laser diode array 614 causes the individual laser beams to occupy a more limited spaced (for example, note how more beams are concentrated in a more limited space within the Y axis when the laser diode array is rotated) when considered in a linear manner along the plane defined by the substrate upon which the laser diode array is focused. Additionally, by mounting the laser diode array 614 on the physical central position; the array can be pitched orthogonally about its longitudinal axis, in relation to the slope or curvature on the application surface, that is, the substrate 626. For example, if the desired coating surface was curved the laser diode array 614 can be sloped in such a fashion as to accommodate for the curvature of the surface of the substrate 626.

Figure 17:
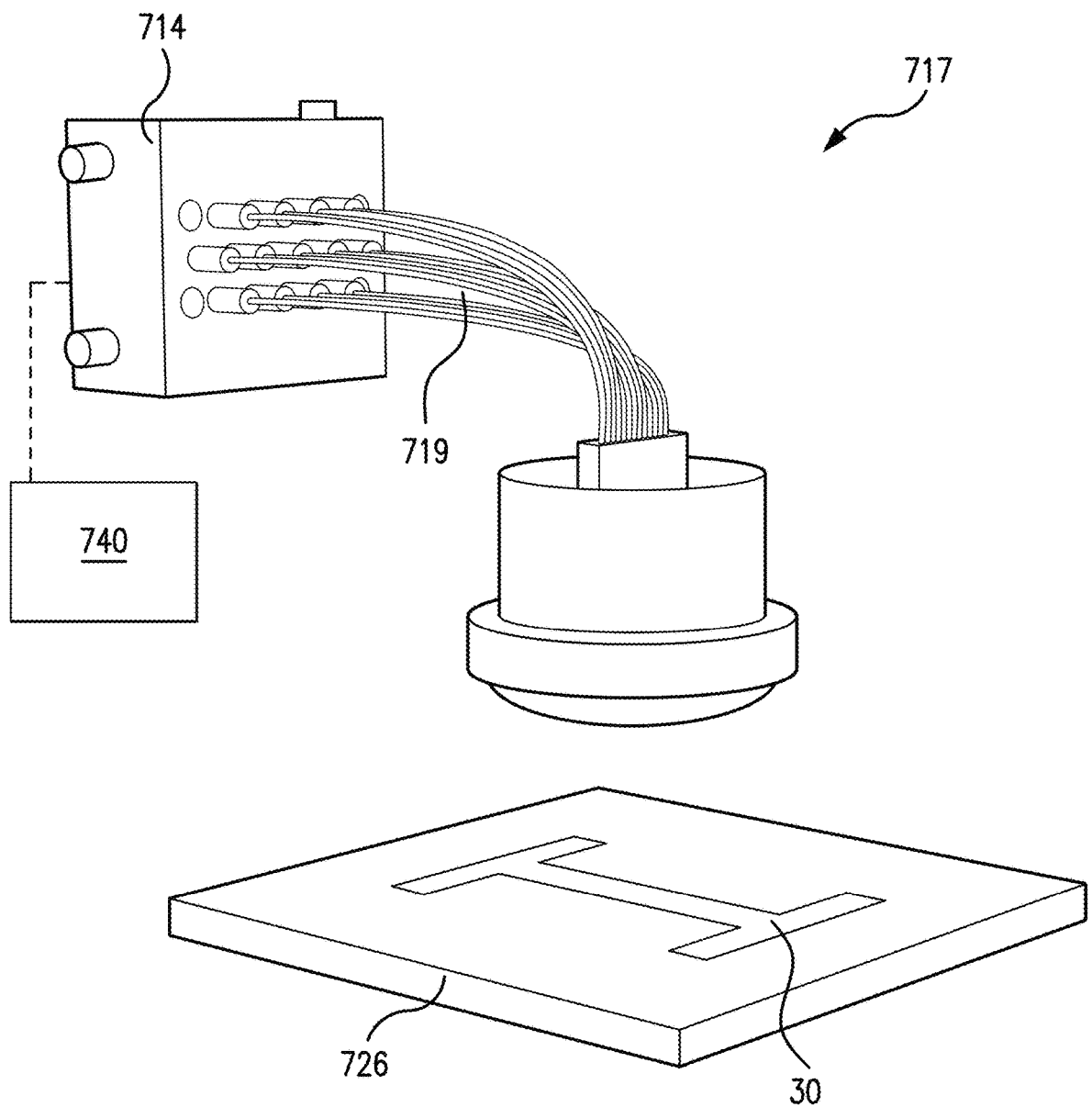
FIG. 17 is a perspective view of another embodiment of a laser emitter for use in conjunction with the present invention.
Figure 18:
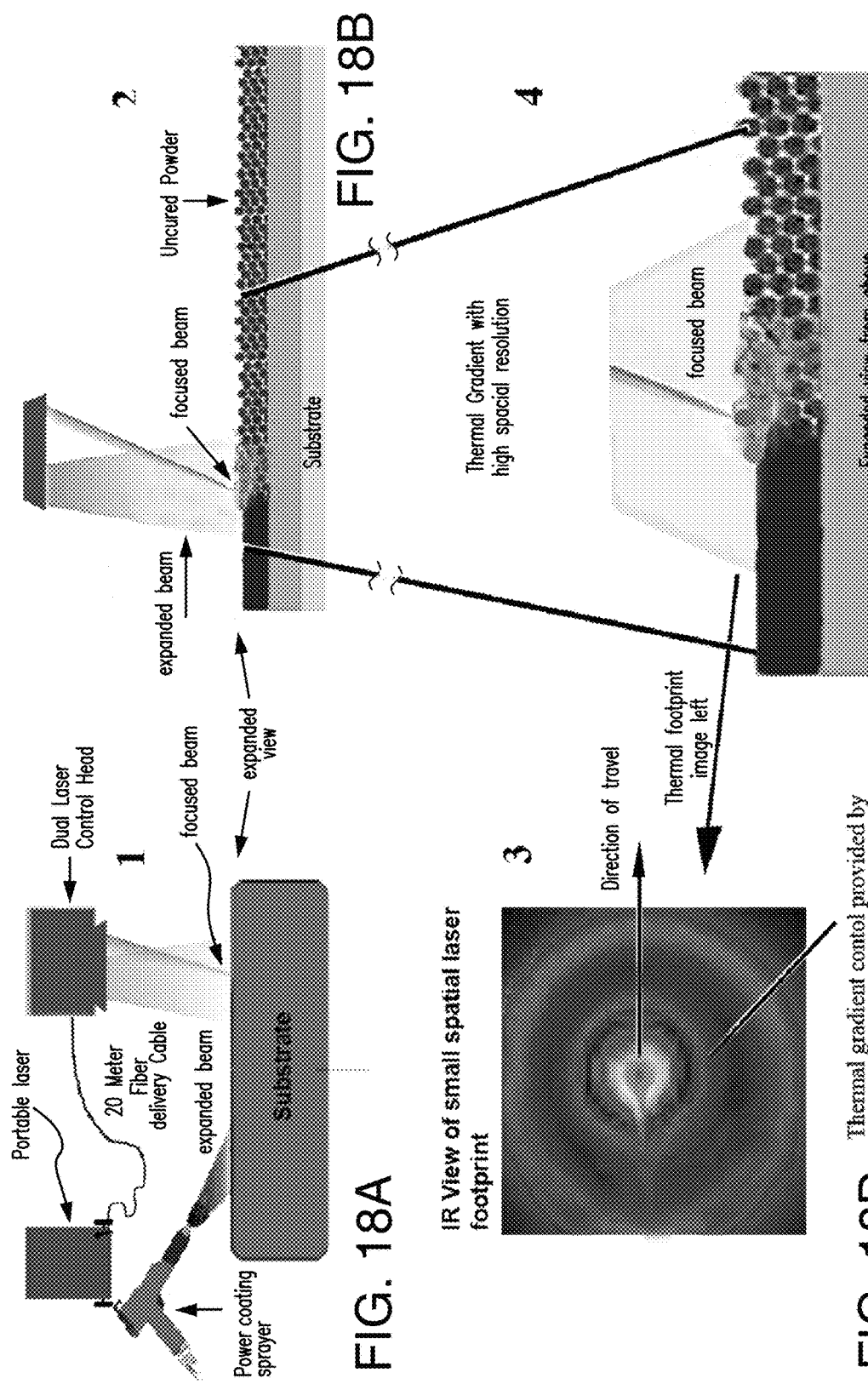
FIGS. 18A, 18B, 18C, and 18D a side view showing use of the laser emitter of FIG. 17, a detailed side view showing use of the laser emitter of FIG. 17, a more detailed side view showing use of the laser emitter of FIG. 17, and an image showing thermal gradient control provided by the system.

It may not always be desirable to have the diode laser arrays specifically located on the control gantry or central positioning head. In accordance with an embodiment as disclosed with reference to FIGS. 17 and 18, the diode laser array 714 is held remote and coupled to a fiberoptic delivery system 717 composed of a projection lens under the control of the computer-based control system 740 held above the substrate 726 by a substrate assembly (for example, similar to that disclosed above with reference to FIGS. 6 to 8). The advantage of using the fiber-optic delivery system 717 is that the fibers 719 of the fiber-optic delivery system 717 form a very dense uniform network that produces a high resolution pixel pitch and therefore a better image when the electromagnetic radiation being emitted by the laser diode array 714 is ultimately applied in the curing of the colored powder coating materials 30. Additionally, the bundle of fibers 719 is lighter and easier to manipulate than a laser diode array stack. Further, the fiber bundle requires less optics to focus the diode power onto the target surface. As shown in FIG. 18, the fiber optic system disclosed with reference to FIG. 17 may be implemented with rotation of the fiber optic delivery system so as to achieve angular transmission of the beams so as to converge the beams as disclosed above with reference to FIG. 16. Rotation may be achieve by rotating the fiber-optic delivery system 717 relative to the support assembly 724 or by providing optical elements within the fiber-optic delivery system 717 that will bend the light being passed through the fiber-optic delivery system 717.

Further still, and with reference to FIGS. 18A, 18B, 18C and 18D, the fiber-optic delivery system 717 may be used in creating both an expanded beam 725 and a focused beam 727. Such an implementation is capable of achieving thermal gradient control while maintaining high processing speed and high spatial resolution.

Figure 19:
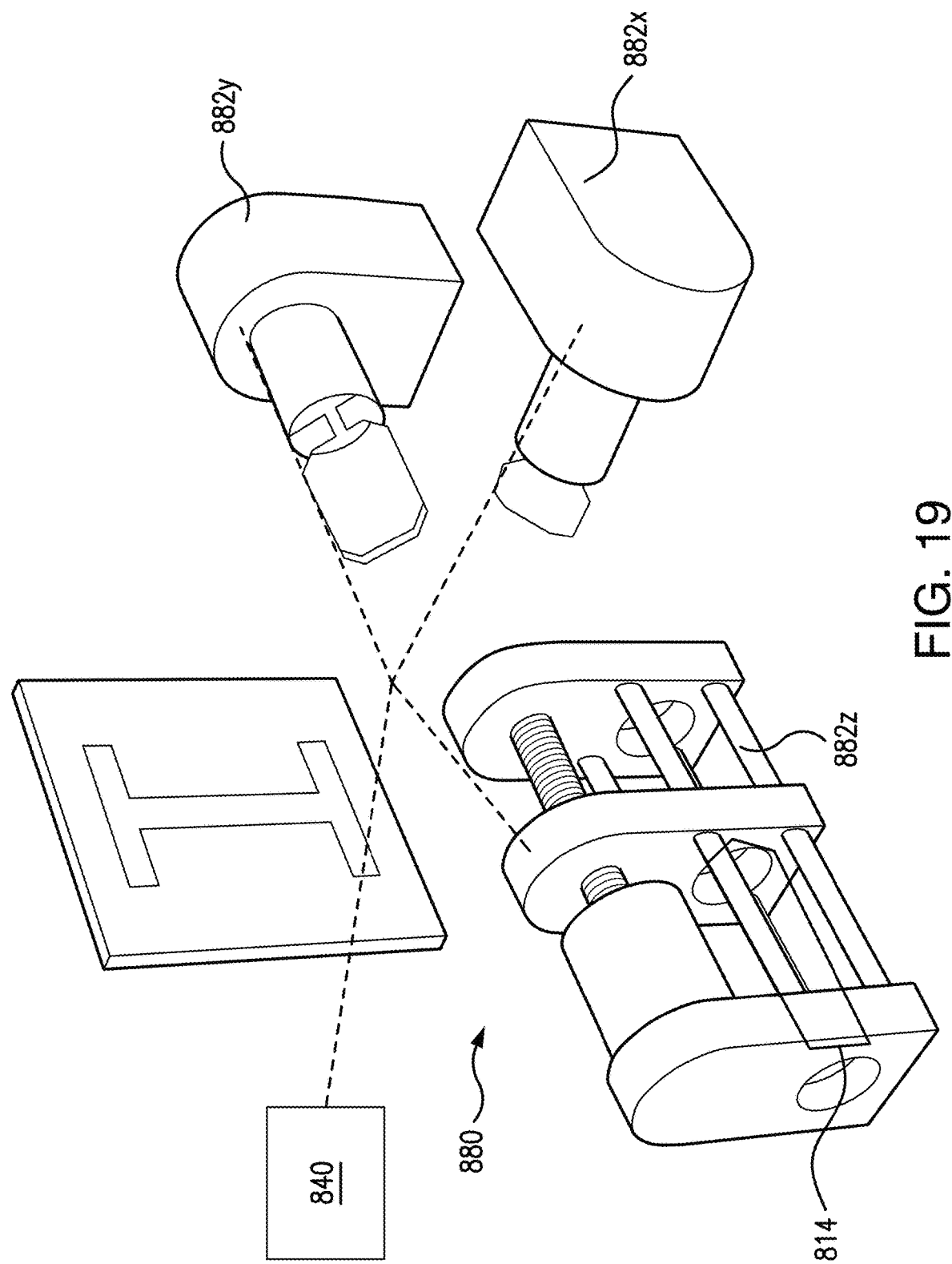
FIG. 19 is a perspective view of an embodiment of a laser emitter for use in conjunction with the present invention.
Figure 20:
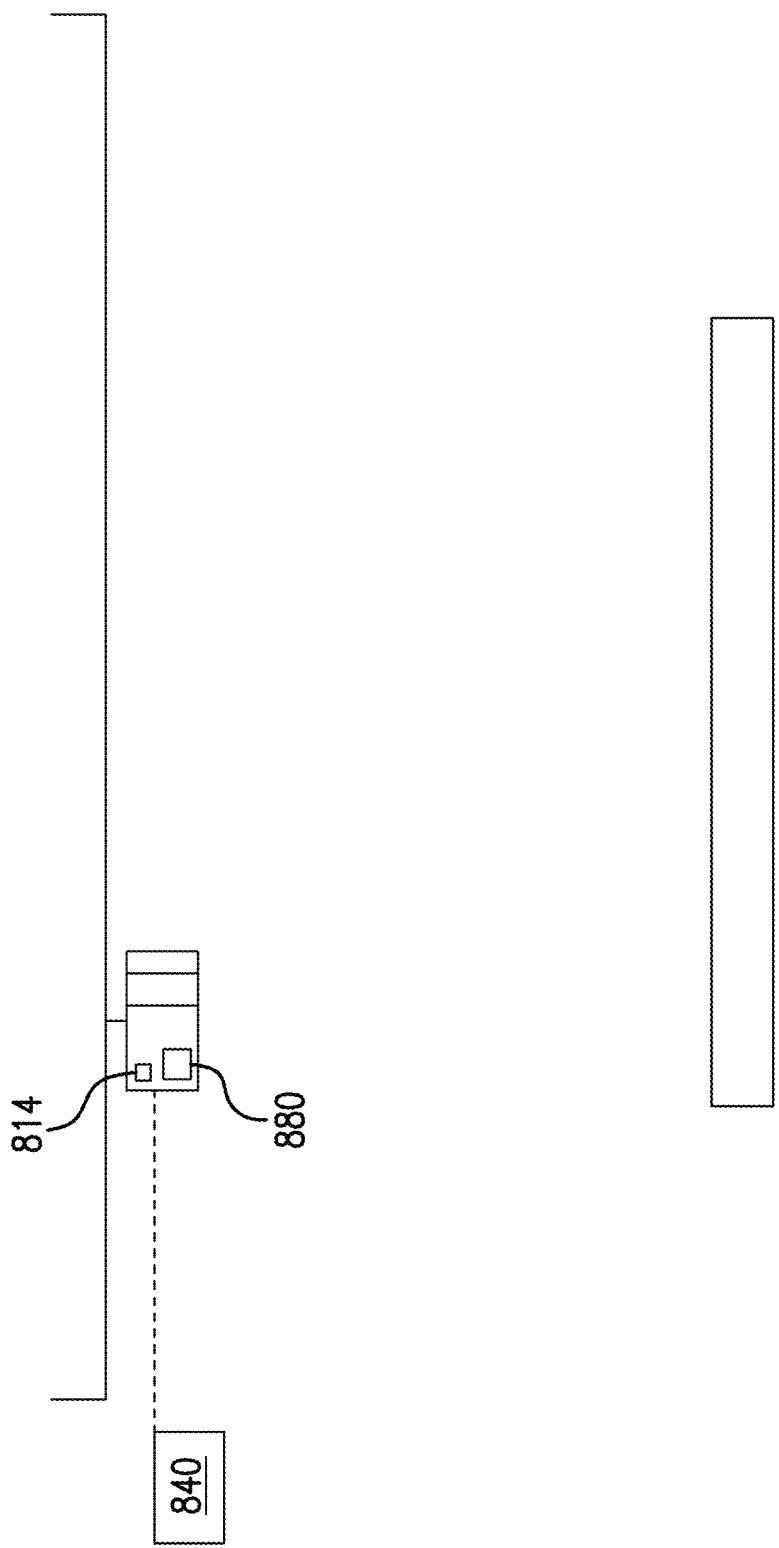
FIG. 20 is a schematic of an embodiment of a system for producing images directly on a surface using the laser emitter disclosed with reference to FIG. 18.

In conjunction with this or other embodiments disclosed herein, and with reference to FIGS. 19 and 20, the electromagnetic radiation being emitted by the laser emitter 814 (whether it is a singular laser, a laser diode array, or a laser diode array in conjunction with a fiber-optic delivery system) can also be manipulated by the addition of XY mirrors such as an available galvanometric control system 880 (see FIG. 19). Delivery of the transmitted light to specific location on a substrate may also be achieved via stepper motors or robotic manipulators. The use of such a control system significantly increases the ease of application on compound surfaces. This arrangement is best suited for large structures such as aircraft and large trucks.

There are several other factors that affect the image quality produced by the laser illustration system. Pixel density in particular is affected by additional factors such as control integration spacing. Additionally, the number of diode elements and the footprint of the fiber delivery bundle increase the optical properties of the system. Further, the colored powder coating materials can also determine image quality and image resolution. This is because there is a large selection of coatings with various melt viscosities.

Generally speaking, materials with low melt flow viscosities will tend to form smaller dots or Picture Elements and will get lumped together with nearby dots or Picture Elements versus those that have a higher melt flow viscosity. Another factor in the control of pixel density and application during image formation is the dimensions of the specific dot element or Picture Element before it is cured or fused by the laser. In the case of powder coatings, the powders can be ground to a finer dimension which is commonly termed, "classification" the results being a finer Picture Element size when combined with the correct optics. Additionally, the use of finer colored powder coating materials requires less post processing of the image. This is because fine powder coating particles melt flow at much lower power and energy levels and dwell times.

With this in mind and referring to FIGS. 19 and 20, a laser emitter 814 is depicted whereby the laser energy is steered onto the target surface using a galvanometric control system 880 composed of a plurality of galvanometers 882*x*, 882*y*,

882z. In this depiction the galvanometric control system 880 is coupled with a laser emitter 814 and its beam is first steered by a Z axis servo 882z and then scanned over the target surface using a predetermined power density. The surface is subsequently imaged and recorded by a radiometric infrared camera recording and this data is provided to the computer-based control system 840. The recorded data is analyzed by the computer-based control system 840 and dimensionally recorded over the target surface. The thermal anomalies are used to control the laser power over the exact same surface during a second rescan during which the colored powder coating materials 30 is applied and cured. Whereby the laser power is increased or decreased to produce a uniform temperature as desired by the applicator that is in accordance with the desired coating melt temperature. Additionally, a closed loop thermal feedback system as described above may be used in conjunction with this embodiment so as to ensure that the colored powder coating materials are at and above the melt temperature for a specific period of time to optimize the melt flow of the coating. This technique makes for a much smoother coated surface and a much better image. Further this process causes the combined coats to be dithered and substantially integrated.

Additionally, where the galvanometric control system 880 is a long wave (wavelengths longer than 5 μm) laser system, additional value is provided because it is not as color sensitive as other types of laser such as systems where short-wave diode lasers are used. This is particularly true of very large professional images that require a very smooth uniform surface. Additionally, the use of longer wavelength electromagnetic radiation also applies to those images that require a clear topcoat. In this case a more powerful laser source with a much longer wavelength than what is available with most diode lasers is indispensable. This is because most diode lasers have short wavelengths as is typical with diode lasers designs. These wavelengths will pass directly through the clear coat top without any energy absorption.

Another benefit of choosing to couple diode lasers for coating application in concert with long wave $CO_2$ lasers is that using both of them in unison can greatly enhance application speed. This is because many images have large and dominant color themes that can be more readily applied with a galvanometer-based $CO_2$ laser system. While the highly multi-pigmented pixel dense areas can be easily handled with diode arrays. The importance of color fidelity using this technology can be maintained in several distinct ways. The following is a short list of attributes that can be used to maintain the color fidelity of the original image.

Use of larger number of shades of various colors including and hues in the original color separation formulation. This more complex technique produces a high-resolution color accurate image.

Translucent CMYK (cyan magenta yellow and black) are typically applied over a white substrate. These types of coatings require a high degree of translucence in order for the color rendering to be correctly maintained. However, using translucent coatings can produce a much wider variety of colors without requiring a large number of pigments to be chosen from.

Dot size/Picture Element can contribute significantly to rendering a high-fidelity color image. This of course requires an increased number of Picture Elements that in turn require finer powders and more sophisticated optics to apply them.

In summary it should be kept in mind, that most poster ready images have a dot pitch of 150 dpi, or higher. Further to this, most of these images can be closely represented with a color separation between 12 to 16 selected colors. In many circumstances a color separation of only eight colors are necessary. The formulation used for test in this application was the Floyd-Steinberg algorithm of color separation.

As described, one of the keys to applying the coating pixel or dot color element is the correct application of laser power. New or unfamiliar powder coatings should be first tested and quantified before use in actual applications. This data then can be an added to a list or a lookup table of selectable coatings in the computer-based control system and can then be referred to at any time in the future for application control. In order for correct color fidelity to be maintained the spot size should be as small as possible, in most cases the spot size should be on the order of 0.0192 to 0.035 inches in diameter. The larger the spot size, the more granular the image will appear. When a small portion of the target is scanned by the laser beam, the laser selectively radiates portions of the powder or the field area that the powder needs to adhere to. The beam is raster scanned over the entirety of the surface and is turned on and off or modulated selectively in order to fuse only those Picture Elements or dots where they are needed. Additionally, in areas of large contiguous color regions it is easier to apply a dot matrix at the furthest extent of the edges of the dominant color only. The interior of the contiguous region can then be over scanned (filled) in its entirety after the edges are established such as with text. Text is generally of the same color and is easier to fill in the internal area of a designated letter in a raster scan than with individual pixel or dot elements. In an example of the raster scan mode over a letter, the laser beam is scanned in the X direction and is incremented in the Y direction at the end of each field. When using the present invention, the results and savings of time are much greater than that of using singular pixel or dot elements. The present invention considers the melt flow viscosity of the various materials in order to produce an image that is substantially integrated and dithered that produce smooth and consistent results. In order for the colored powder coating materials to fully cross-link or cure, a final over scan of the entire image is produced with overlapping beam on the target area. This is also accomplished with the use of the raster scan in a XY pattern. In order to handle surfaces with compound dimensions, (surfaces other than flat) an additional Z axis focusing element is included in the present invention as shown with reference to the embodiments disclosed with reference to FIGS. 6, 7, 8A and 8B. This keeps power density on target consistent such that an appropriate cure and dwell time is maintained across the entirety of the surface. When using the Z axis element, it is necessary to have a means which is readily available to calculate the distance from the objective to the target surface. Often this dimension can be obtained with the use of a distance monitoring device, a pre-scan of the surface with a computerized telemetry system, or in many cases a CAD drawing of the object being coated. The distance monitoring systems may be used alone or in combination to ensure that the contour of the substrate is being properly followed. The use of distance monitoring device and/or CAD drawings while applying images and coatings is aided by the fact that these images can be integrated in several steps. Additionally, a compound or contour surface can be coated with a uniform power density as previously described and determined by the following.

1. Over scan the entire target area with a low but stable predetermined power value.
2. Record the over scan power density step above with a high-resolution thermal imaging radiometric camera.

3. Dimensionally map the entirety of the surface area that has been described above as having divided the substrate in a plurality of sections covering the entire surface of the substrate. These sections are mapped in a Cartesian coordinate system (two-dimensional) and compare it with the above thermal image.
4. Rescan the same thermally mapped coordinate system with a closed loop controlled $CO_2$ laser that modulates its power to achieve a uniform thermal distribution by the application of power referenced to the target temperature derived from the original thermally mapped region. Where the temperature depicted on the reference image is lower than required the laser power is proportionately increased with the required power to meet said reference level.

The means for which these images are integrated onto the substrate 26 in accordance with the present invention can be accomplished visually with obviated registration markers. However, a better and more accurate method is to use an electronic means of registration that keeps track of the segmented images and the relationship to each other.

Figure 21:
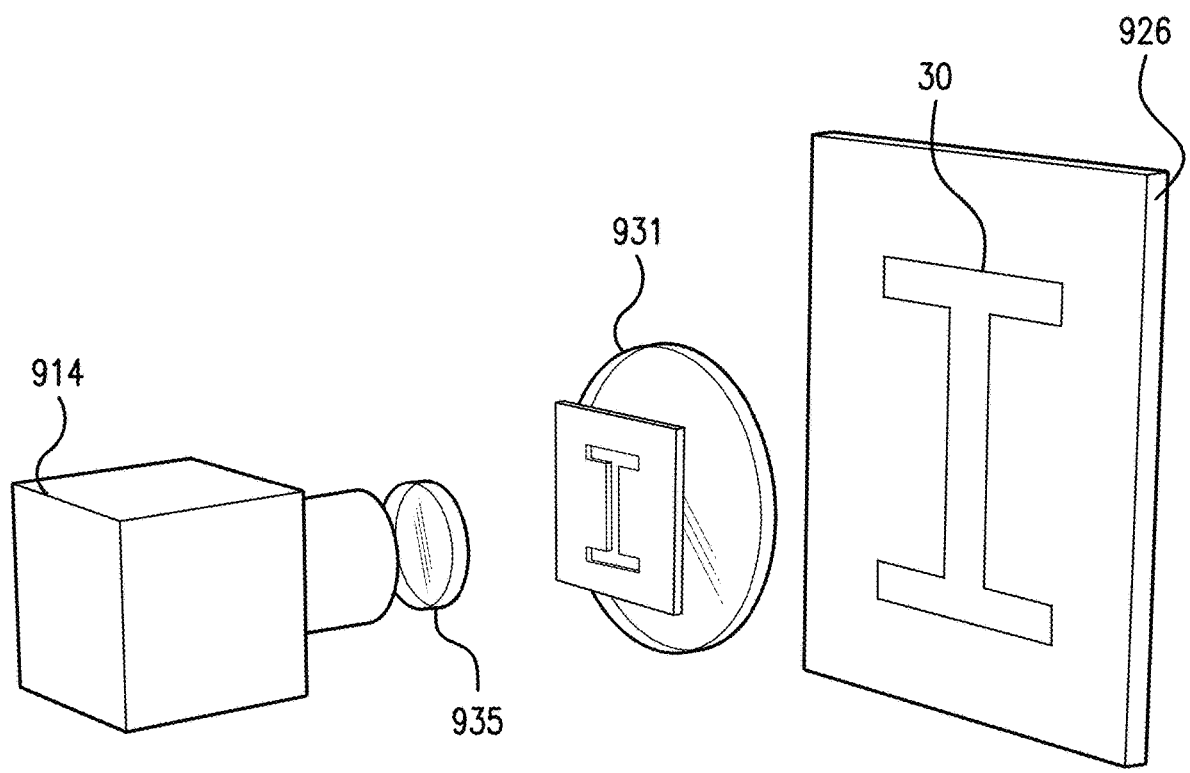
FIG. 21 is a perspective view of an embodiment of a laser emitter for use in conjunction with the present invention.
Figure 22:
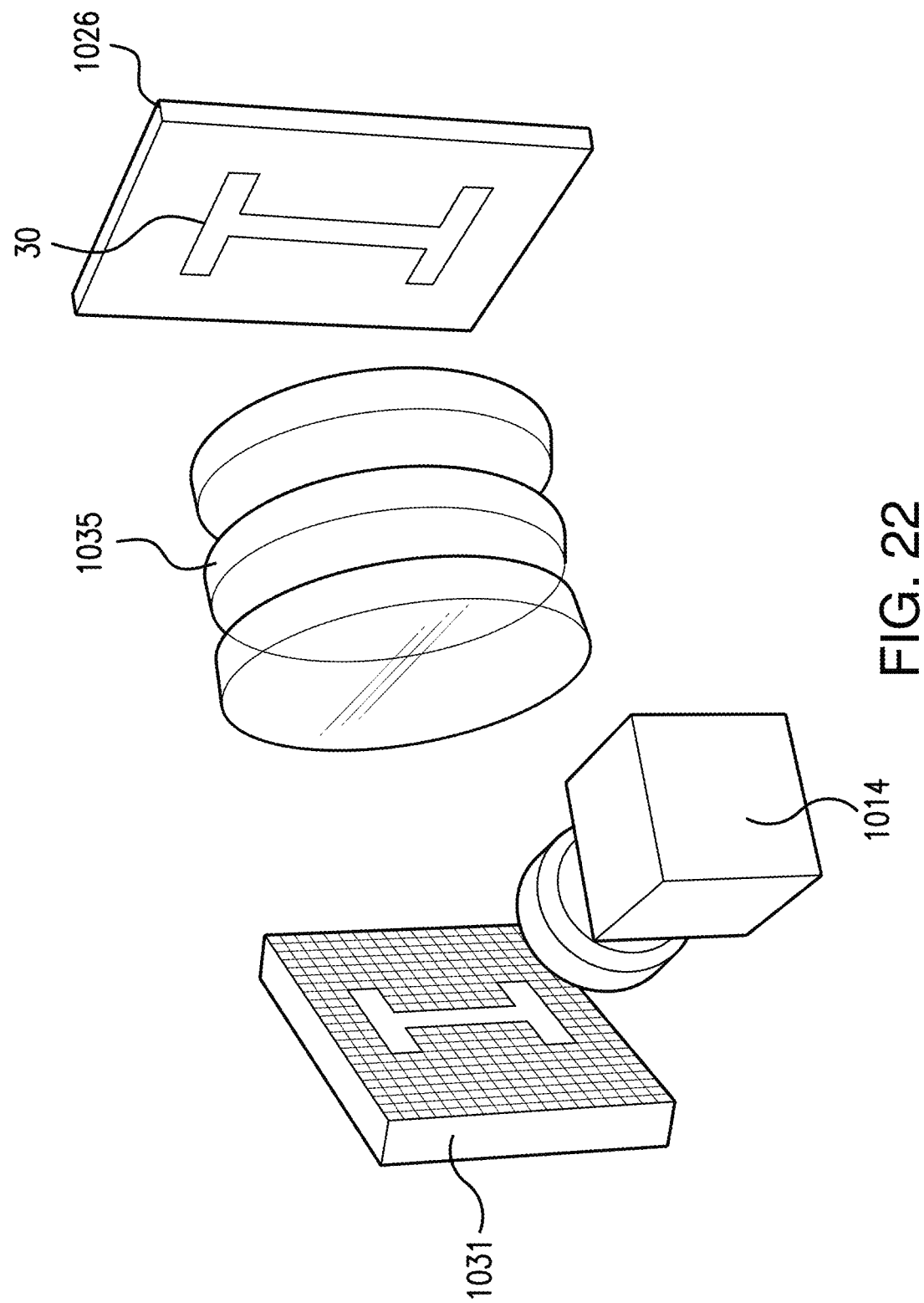
FIG. 22 is a perspective view of another embodiment of a laser emitter for use in conjunction with the present invention.

In accordance with further embodiments, and with reference to FIGS. 21 and 22, digital image projection devices 931, 1031 are conjunction with electromagnetic radiation sources 914, 1014. The digital image projection devices 931, 1031 are used not only for image placement, but also for image creation and fusing of the coating. Referring to the embodiment shown in FIG. 21, an LCD screen 931 is positioned between the electromagnetic radiation source (that is, a laser emitter in accordance with a disclosed embodiment) 914 and a target 926. As a result, the LCD screen 931 controls the application of the electromagnetic radiation being emitted by the electromagnetic radiation source 914 to the target 926. The LCD screen 931 is used to generate specific patterns electrically. These patterns are then be projected onto a surface of the target 926 as the electromagnetic radiation being emitted by the electromagnetic radiation source 914 passes through the LCD screen 931 and onto the surface of the target 926. The electromagnetic radiation is transmitted onto the surface of the target 926 with sufficient radiant energy to melt and fuse polymers from which colored powder coating materials 30 are made. In order to keep the radiant power density as low as possible, a large LCD screen 931 will be necessary where the radiant energy (laser or otherwise) is expanded uniformly over the LCD screen 931. With the power density requirements being well monitored and uniformly dispersed the LCD screen 931 lends itself directly to larger image application. As shown in FIG. 21 a projector lens 935 is provided to condense image size. This image reduction also increases the power density within the range necessary to fuse or crosslink the desired coatings on the target surface.

Referring to the embodiment shown in FIG. 22, an DMD (Digital Mirror Device) 1031 is positioned between the electromagnetic radiation source (that is, a laser emitter in accordance with a disclosed embodiment) 1014 and a target 1026. As a result, the DMD 1031 controls the reflection application of the electromagnetic radiation being emitted by the electromagnetic radiation source 1014 to the target 1026. The DMD 1031 is used to generate specific patterns electrically. These patterns are then projected onto a surface of the target 1026 as the electromagnetic radiation being emitted by the electromagnetic radiation source 1014 reflects off of the DMD 1031 and onto the surface of the target 1026. The electromagnetic radiation is transmitted onto the surface of the target 1026 with sufficient radiant energy to melt and fuse polymers from which colored powder coating materials 30 are made. In order to keep the radiant power density as low as possible, a large DMD 1031 will be necessary where the radiant energy (laser or otherwise) is expanded uniformly over the DMD 1031. With the power density requirements being well monitored and uniformly dispersed the DMD 1031 lends itself directly to larger image application. As shown in FIG. 22 plural lenses 1035 are positioned between the DMD 1031 and the target 1026 to condense image size. This image reduction also increases the power density within the range necessary to fuse or crosslink the desired coatings on the target surface.

The use of DMD devices and LCD image projection in many cases can significantly increase processing speed and image resolution. Referring to FIG. 22, the electromagnetic radiation is emitted from the projector 1014 onto the DMD 1031 where the image formation is generated. This image is then captured and reduced by the lens elements 1035 and then focused onto the target item. This target surface of the substrate 1026 is coated with the correctly pigmented resin from which colored powder coating materials 30 are made that is to be fused to the target substrate 1026 at and where it is necessary for proper image formation. The same process as described above can be generated the same way using an appropriate LCD screen 931 with the image formed digitally within the LCD screen 931 itself.

According to another embodiment of this invention, it is appreciated graphical image projection over the desired surface to be coated may be employed. The graphical image projection can be used to register specific points of image integration. It also can be used as an alignment facilitator when coupled with a human operator that aligns the galvanometer or galvanometer system at specific coordinates that are selected through a viewing camera that in turn images the same image graphical projection described above. This will allow a human operator to accurately align the projected image with the galvanometer control system 40. The use of low-power targeting lasers can be scanned over the area in a rapid manner that enables the user to confirm the placement of the image before the actual coating application begins.

With reference to the cross-sectional view in FIG. 23, an additional attribute of present invention involves the ability to apply interlaminar conductive traces. This is similar to the production of multilayer circuit boards produced for the electronics industry. Where separate conductive traces are routed throughout the several laminations of the desired circuit board. This technique utilizes a series of successive coating layers 1113 applied involving conductive materials and nonconductive materials on top of individual layers or a substrate 1126.

The substrate 1126 is first coated with an electrically nonconductive layer 1113 producing an insulating nonconductive layer. The nonconductive layer 1113 is then subsequently etched to form channels 1115 while substantially preserving its insulating properties in a prescribed path to receive and be filled with a conductive material 1117. The conductive material 1117 is then fused, using the concepts underlying the present invention, with sufficient electromagnetic radiation to form a solid body within the confines of the etched channel via a physical or chemical process. This establishes a circuit path. Once the conductive material has been deposited, a layer of nonconductive material 1119 shall be cured in placed above the previous layer which will entrain the channels 1115 filled with conductive material 1117 between nonconductive material layers 1113, 1119. Through methodologies like laser ablation, the nonconductive surface can be electronically accessed by ablating down to the conductive material layer at select points or through holes which will facilitate the creation of electrical circuits. Ablation can also be performed to reach the substrate to allow the substrate to integrate into the circuit as long as the substrate is conductive. The topmost nonconductive surface can also be a substrate to accept graphically applied coatings or the nonconductive surface can be a graphically illustrated with additional coatings.

In any of the above descriptions, other control techniques may also be utilized in combination with reduced scan fields to improve controlled uniformity over surfaces with compound topography. As noted above the use of telemetry and metrology-equipment can be integrated with the system in order to maintain dimensional integrity. Additionally, a suitable conductive ink can be manufactured that easily fills the above described etched channels and that easily cured with long wave lasers is composed of the following.

A radiation curable sample was made from the following components
- 1050 micrograms of silver acetate
- 2.5 mL of concentrated ammonia solution
- Stir the above until dissolved to form diamine silver acetate
- Titrate with 2 mL of Formic acid
- Mix above contents to form ammonia formate
- Allow solution to cool and settle
- Filter out all precipitates
- Add 225 micrograms of carbon nanotubes and sheer blend until smooth.

The inclusion of carbon nanotubes in the above mixture increases the absorption of long wave electromagnetic radiation and can be varied to control the rate of cure. Additionally, the addition of carbon nanotubes increases the flexure modulus of the silver electrical traces significantly. Further enhancement of conductive properties as well as to increase bond strength the addition of Poly(3,4-ethylenedioxythiophene) or PEDOT can be added or used for the entirety of the trace on its own.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A system for producing a 3D image directly on a substrate, the system comprising:
   an operational curing system comprised of a thermal acquisition system, a distance monitoring device, and a directed radiant energy source;
   a support assembly providing movement of the operational curing system along three orthogonal axes relative to the substrate;
   a coating material delivery system for applying colored powder coating material to the substrate; and
   a computer-based control system configured to control the operational curing system, the support assembly, and the coating material delivery system so as to apply a first colored powder coating material having a first color to the substrate, selectively cure the first colored powder coating material using information from both the distance monitoring device and the thermal acquisition system by fusing the first colored powder coating material along a prescribed path corresponding to Picture Elements of the 3D image for the first color, remove an uncured amount of the first colored powder coating material from the substrate, and repeat the steps of applying, selectively curing, and removing for a second colored powder coating material having a second color,
   wherein the computer-based control system is further configured to determine a sufficient state of cure unique to each of the first and second colored powder coating materials by a rapid temperature assessment provided by the thermal acquisition system such that each of the applied first and second colored powder coating material remain in place on the substrate after said curing.

2. The system according to claim 1, wherein the directed radiant energy source is a laser emitter.

3. The system according to claim 2, wherein the laser emitter includes a galvanometric control system.

4. The system according to claim 2, wherein the laser emitter is a diode laser.

5. The system according to claim 4, wherein the diode laser includes piezo elements.

6. The system according to claim 4, wherein the laser emitter further includes an optical mirror and optical focusing elements that focus emitted electromagnetic radiation at a desired location.

7. The system according to claim 1, wherein the directed energy source includes an electromagnetic radiation source and an LCD screen positioned between the electromagnetic radiation source and the substrate.

8. The system according to claim 1, wherein the directed energy source includes an electromagnetic radiation source and a digital mirror device positioned between the electromagnetic radiation source and the substrate.

9. The system according to claim 1, wherein the support assembly includes multiple axes gantry systems, robotic systems, or combinations thereof.

10. The system according to claim 9, wherein the support assembly includes an XY gantry.

11. The system according to claim 1, further including a closed loop monitoring system comprising a high speed pyrometer for providing the rapid temperature assessment.

12. The system according to claim 1, further including a Charge-Coupled Device analyzing returned scattering of electromagnetic radiation emitted by the directed radiant energy source.

13. The system according to claim 1, wherein the directed radiant energy source is a laser diode array.

14. The system according to claim 13, wherein the laser diode array may be rotated.

15. The system according to claim 13, wherein light from the laser diode array is transmitted via a fiberoptic delivery system.

* * * * *